United States Patent
Yu et al.

(10) Patent No.: US 12,050,825 B2
(45) Date of Patent: Jul. 30, 2024

(54) METHOD AND DEVICE FOR FORMING CONSECUTIVE IMAGES WITH ALTERNATING RECORDING MEDIUM ARRANGEMENT

(71) Applicant: Zhuhai Pantum Electronics Co., Ltd., Zhuhai (CN)

(72) Inventors: Chengzhu Yu, Zhuhai (CN); Aiguo Yin, Zhuhai (CN); Dan Ning, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 18/192,625

(22) Filed: Mar. 29, 2023

(65) Prior Publication Data

US 2023/0315363 A1    Oct. 5, 2023

(30) Foreign Application Priority Data

Mar. 30, 2022  (CN) .......................... 202210356553.5

(51) Int. Cl.
*G06F 3/12* (2006.01)

(52) U.S. Cl.
CPC ............ *G06F 3/125* (2013.01); *G06F 3/1203* (2013.01); *G06F 3/1262* (2013.01)

(58) Field of Classification Search
CPC ...... G06F 3/125; G06F 3/1203; G06F 3/1262; G06F 3/1242; G06F 3/1285; G06F 3/1204; G06F 3/1206
See application file for complete search history.

(56) References Cited

U.S. PATENT DOCUMENTS

| 9,740,971 B1 | 8/2017 | Iwasawa et al. |
| 2002/0048475 A1 | 4/2002 | Kojima |
| 2007/0222141 A1* | 9/2007 | Ozaki ................ G03G 15/6529 271/171 |
| 2008/0088863 A1* | 4/2008 | Suzuki .................... G06F 3/125 358/1.9 |

FOREIGN PATENT DOCUMENTS

| EP | 3223135 A1 | 9/2017 |
| RU | 2569564 C2 | 11/2015 |
| RU | 2599535 C2 | 10/2016 |

OTHER PUBLICATIONS

English Machine Translation of JP H11164084-A (Okumura, Published Jun. 18, 1999) (Year: 1999).*
English Machine Translation of KR 20200126652 A (Park, Published Nov. 9, 2020) (Year: 2020).*
English Machine Translation of JP 2004272484-A (Toda, Published Sep. 30, 2004) (Year: 2004).*

* cited by examiner

*Primary Examiner* — Juan M Guillermety
(74) *Attorney, Agent, or Firm* — ANOVA LAW GROUP PLLC

(57) ABSTRACT

A method for forming an image includes: receiving a first image-forming job, and performing a first image-forming operation according to a first recording-medium transport rule; receiving a second image-forming job, and performing a second image-forming operation according to a second recording-medium transport rule. The first image-forming job and the second image-forming job are consecutively outputted image-forming jobs, and recording-medium transport directions of at least one page of the first image-forming job and at least one page of the second image-forming job are different.

20 Claims, 12 Drawing Sheets

METHOD AND DEVICE FOR FORMING CONSECUTIVE IMAGES WITH ALTERNATING RECORDING MEDIUM ARRANGEMENT

CROSS-REFERENCE TO RELATED APPLICATION

This application claims the priority of Chinese Patent Application No. 202210356553.5, filed on Mar. 30, 2022, the content of which is incorporated herein by reference in its entirety.

TECHNICAL FIELD

The present disclosure relates to the technical field of image forming and, more particularly, to a method for forming an image, a device, and a computer readable storage medium.

BACKGROUND

An image-forming device is a device that forms an image on a recording medium according to an imaging principle, such as a printer, a copier, a facsimile machine, a multifunctional image making and copying device, an electrostatic printing device, and any other similar device.

The printer is used as an example herein. In existing technologies, the printer can be shared by multiple users, that is, different users can consecutively send print jobs to the same printer. In addition, a same user can consecutively send multiple print jobs to the same printer. Various print jobs that are consecutively outputted are stored on a paper discharge tray in a mixed manner, so that each user needs to distinguish the print jobs by turning over an entire stack of papers on the paper discharge tray and retrieving print content in last pages of the print jobs each time, which is a cumbersome operation for the user.

In order to solve the above problems, there are various solutions in the existing technologies, which will be illustrated by examples below. A first solution is to print a user identification on first and/or last page of each print job to distinguish the print jobs for each user. A second solution is to print a first banner on an edge of a first print job and a second banner on an edge of a second print job, so that even if the user is viewing a stacked print jobs with multiple print jobs, each print job can be distinguished by viewing a banner on the edge. A third solution is to use separators or special papers to distinguish each print job.

However, in the first solution where the print jobs for each user are distinguished by printing the user identification on the first and/or last page of each print job, only the print jobs for different users are distinguished, while each print job cannot be distinguished when multiple print jobs are consecutively printed for the same user. In the second solution where each print job is distinguished by the banner on the edge of each print job, on one hand, the banner printed on the edge affects aesthetics of the print job, which results in a decrease in print quality; on the other hand, printing content other than what the user needs to print on papers may not meet user's printing needs, and it is not allowed to produce other patterns or texts other than those required in some printed documents. In the third solution where each print job is distinguished by the separators or other special papers, there is a problem of waste of materials such as papers.

SUMMARY

In accordance with the present disclosure, there is provided a method for forming an image. The method includes: receiving a first image-forming job, and performing a first image-forming operation according to a first recording-medium transport rule; receiving a second image-forming job, and performing a second image-forming operation according to a second recording-medium transport rule. The first image-forming job and the second image-forming job are consecutively outputted image-forming jobs, and recording-medium transport directions of at least one page of the first image-forming job and at least one page of the second image-forming job are different.

Also in accordance with the present disclosure, there is provided an image-forming device including a processor and a memory configured to store a computer program. When the computer program is executed, the processor is configured to perform a method including: receiving a first image-forming job, and performing a first image-forming operation according to a first recording-medium transport rule; and receiving a second image-forming job, and performing a second image-forming operation according to a second recording-medium transport rule. The first image-forming job and the second image-forming job are consecutively outputted image-forming jobs, and recording-medium transport directions of at least one page of the first image-forming job and at least one page of the second image-forming job are different.

Also in accordance with the present disclosure, there is provided a non-transitory computer readable storage medium containing a stored program. When being executed, the stored program causes a device where the computer readable storage medium is located to perform a method including: receiving a first image-forming job, and performing a first image-forming operation according to a first recording-medium transport rule; and receiving a second image-forming job, and performing a second image-forming operation according to a second recording-medium transport rule. The first image-forming job and the second image-forming job are consecutively outputted image-forming jobs, and recording-medium transport directions of at least one page of the first image-forming job and at least one page of the second image-forming job are different.

BRIEF DESCRIPTION OF THE DRAWINGS

In order to explain the technical solutions in the embodiments of the present disclosure more clearly, reference is made to the accompanying drawings, which are used in the description of the embodiments. Obviously, the drawings in the following description are only some embodiments of the present disclosure, and other drawings can be obtained from these drawings without any inventive effort for those of ordinary skill in the art.

DETAILED DESCRIPTION OF THE EMBODIMENTS

In order to better understand the technical solutions of the present disclosure, the embodiments of the present disclosure are described in detail with reference to the accompanying drawings.

Obviously, the described embodiments are only some of rather than all the embodiments of the present disclosure. Based on the described embodiments, all other embodiments obtained by those of ordinary skill in the art without inventive effort shall fall within the scope of the present disclosure.

As described herein, terms used in the embodiments of the present disclosure are intended to describe example embodiments, instead of limiting the present disclosure. The singular forms "a," "an," and "the" used in the embodiments of the present disclosure and the appended claims are intended to include plural forms as well, unless the context clearly indicates otherwise.

It should be understood that the term "and/or" used in this specification is only an association relationship to describe related objects, indicating that there can be three kinds of relationships. For example, A and/or B, which can mean that A exists alone, A and B exist at the same time, and B exists alone. In addition, the character "/" in this specification generally indicates that the related objects are in an "or" relationship.

Figure 1A:
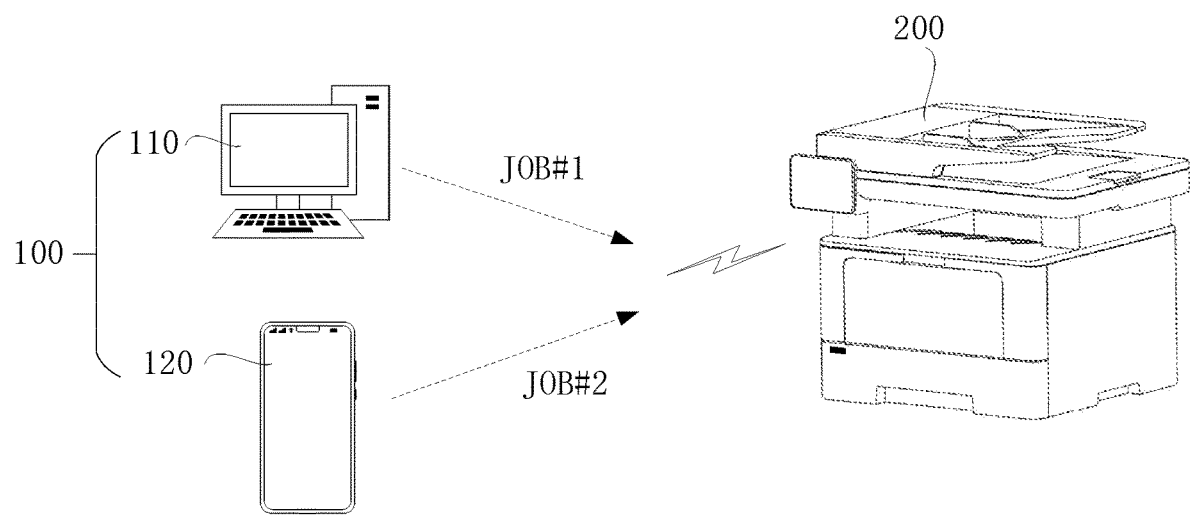
FIG. 1A is a schematic structural diagram of an image-forming system according to an embodiment of the present disclosure.
Figure 1B:
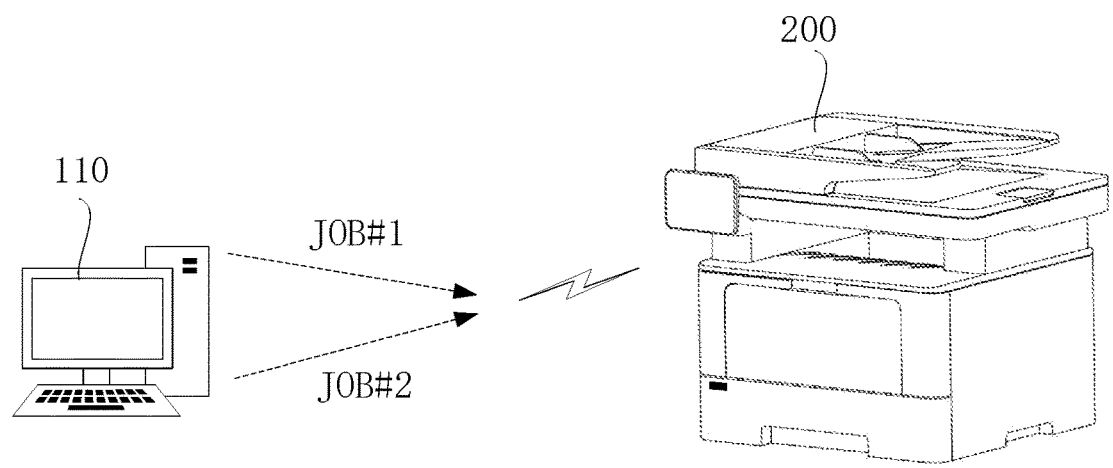
FIG. 1B is a schematic structural diagram of an image-forming system according to an embodiment of the present disclosure.

FIGS. 1A and 1B are schematic structural diagrams of image-forming systems provided by the embodiments of the present disclosure. A control device 100 and an image-forming device 200 are shown in FIGS. 1A and 1B, which can be connected in a wired or wireless manner. The control device 100 can send image-forming jobs to the image-forming device 200, and the image-forming device 200 performs corresponding image-forming operations according to the received image-forming jobs.

The control device 100 includes, but is not limited to, a desktop computer, a laptop computer, a network computer, a palmtop computer (handheld computer), a personal digital assistant (PDA), an internet-enabled mobile phone, a smart phone, a pager, a digital capture device (such as a digital camera or a video camera), an internet device, an e-book, an information board, and a digital or network board. Functions of the image-forming device 200 include, but are not limited to, a print function, a scan function, a copy function, and a fax function. For example, the image-forming device 200 can be one of the following products. A single functional printer is with the print function only. A multifunctional printer is with the print, copy, scan, and/or fax functions, and with an optional setting of number of paper boxes. A digital composite machine is with standard or optional print, scan, and fax functions based on the copy function, which uses digital principles to output files in a form of laser printing, and can edit images and texts as needed, with a large capacity paper tray, high memory, large hard disk, powerful network support, and multitasking parallel processing capabilities.

A communication network connecting the control device 100 and the image-forming device 200 may be a local area network, or a wide area network switched through a relay device. When the communication network is a local area network, the communication network may be, for example, a near field communication network such as a wifi hotspot network, a wifi P2P network, a Bluetooth network, a zigbee network, or a near field communication (NFC) network. When the communication network is a wide area network, the communication network may be, for example, a third-generation wireless telephone technology (3G) network, a fourth-generation mobile communication technology (4G) network, a fifth-generation mobile communication technology (5G) network, a future evolved public land mobile network (PLMN), Internet, etc.

A recording medium involved in the present disclosure refers to a carrier configured to carry image-forming content, such as paper. In some embodiments, in addition to paper, the recording medium can also be a carrier of other materials, which is not specifically limited herein. For ease of understanding, paper is taken as an example for description in this specification.

The image-forming device 200 is usually provided with a paper box and a paper discharge tray, and the paper box is configured to store blank papers (unprinted papers, hereinafter collectively referred to as "input papers"). After the image-forming device 200 performs the image-forming operations on the blank papers, papers on which the image-forming operations are completed (printed papers, hereinafter collectively referred to as "output papers") are transported to the paper discharge tray, and stacked on the paper discharge tray.

It can be understood that if there are multiple consecutive image-forming jobs, the output papers corresponding to the multiple consecutive image-forming jobs will be stacked together on the paper discharge tray. For example, in application scenarios shown in FIGS. 1A and 1B, a user may separately send a first image-forming job "JOB #1" and a second image-forming job "JOB #2" to the image-forming device 200. After the image-forming device 200 completes the first image-forming job "JOB #1" and the second image-forming job "JOB #2", the output papers corresponding to the first image-forming job "JOB #1" and the second image-forming job "JOB #2" are stacked together on the paper discharge tray.

Figure 1C:
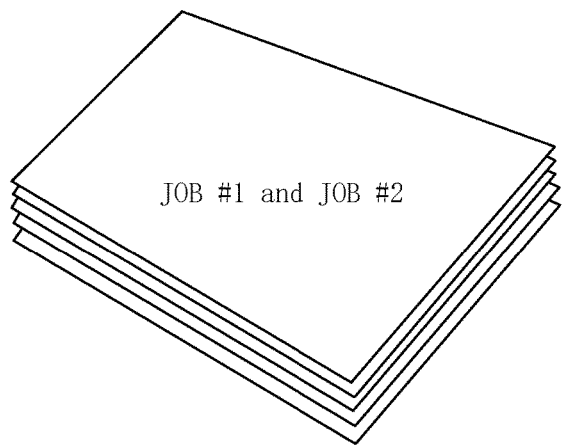
FIG. 1C is a schematic diagram of a stack of papers in existing technologies.

In exiting technologies, an image-forming device performs the image-forming operations according to a fixed paper transport direction, and the output papers corresponding to the first image-forming job "JOB #1" and the second image-forming job "JOB #2" are stacked on the paper discharge tray in a same direction, as shown in FIG. 1C. In order to distinguish the output papers corresponding to the first image-forming job "JOB #1" and the second image-forming job "JOB #2", the user needs to turn over an entire stack of the output papers on the paper discharge tray, and retrieve content of last page of the output papers in the first image-forming job "JOB #1", which is cumbersome for the user.

In a possible implementation manner, the first image-forming job "JOB #1" and the second image-forming job "JOB #2" may be the image-forming jobs sent to the same image-forming device 200 by different users through different control devices 100. For example, in the application scenario shown in FIG. 1A, a user sends the first image-forming job "JOB #1" to the image-forming device 200 through a first control device 110; and another user sends the second consecutive image-forming job "JOB #2" to the image-forming device 200 through a second control device 120.

In a possible implementation manner, the first image-forming job "JOB #1" and the second image-forming job "JOB #2" may be the image-forming jobs sent to the same image-forming device 200 by the same user through the same control device 100. For example, in the application scenario shown in FIG. 1B, a user consecutively sends the first image-forming job "JOB #1" and the second image-forming job "JOB #2" to the image-forming device 200 through the first control device 110.

In a possible implementation manner, the same user may also operate multiple control devices 100 to consecutively send multiple image-forming jobs to the same image-forming device 200. For example, in the application scenario shown in FIG. 1A, the first control device 110 and the second control device 120 are operated by the same user to consecutively send the first image-forming job "JOB #1" and the second image-forming job "JOB #2" to the image-forming device 200 respectively.

In a possible implementation manner, multiple users may also consecutively send multiple image-forming jobs to the same image-forming device 200 through one control device 100. For example, in the application scenario shown in FIG. 1B, the first control device 110 is operated by different users to consecutively send the first image-forming job "JOB #1" and the second image-forming job "JOB #2" to the image-forming device 200 respectively.

The present disclosure does not specifically limit the above application scenarios.

In order to facilitate distinction of the output papers corresponding to multiple image-forming jobs, a method for forming an image is provided by the present disclosure, which will be described in detail below.

Figure 2:
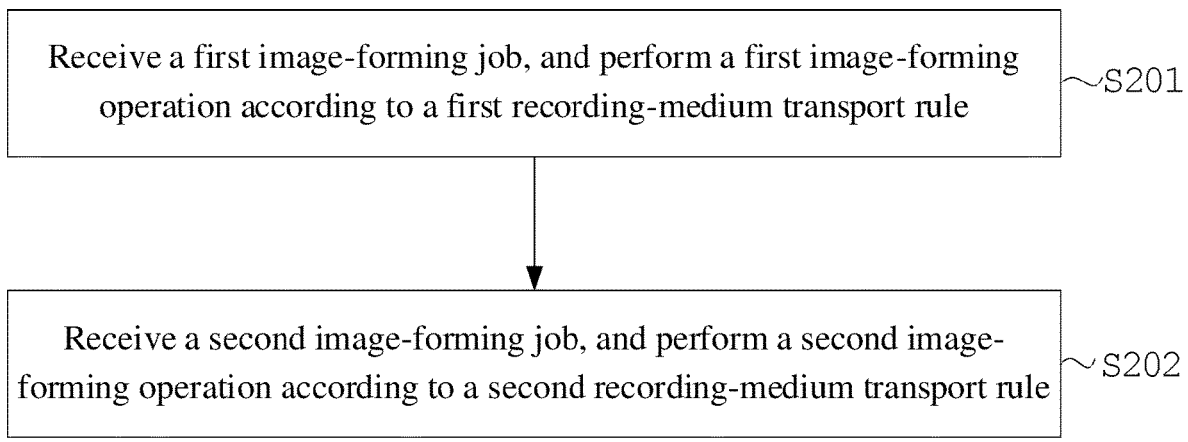
FIG. 2 is a schematic flow chart of a method for forming an image according to an embodiment of the present disclosure.

FIG. 2 is a schematic flow chart of a method for forming an image provided by the embodiments of the present disclosure, which can be applied to the image-forming systems shown in FIG. 1A or FIG. 1B. As shown in FIG. 2, the method mainly includes the following processes.

Process S201, receiving a first image-forming job, and performing a first image-forming operation according to a first recording-medium transport rule.

The first recording-medium transport rule involved in some embodiments of the present disclosure includes information of recording-medium transport direction, which may constrain transport directions of some or all of the recording medium in the first image-forming job. The recording medium involved in some embodiments of the present disclosure may be paper, and the recording-medium transport direction may be understood as paper transport direction.

Process S202, receiving a second image-forming job, and performing a second image-forming operation according to a second recording-medium transport rule.

The second recording-medium transport rule involved in some embodiments of the present disclosure includes information of recording-medium transport direction, which may constrain transport directions of some or all of the recording medium in the second image-forming job. The first image-forming job and the second image-forming job are consecutively outputted image-forming jobs, and recording-medium transport directions of at least one page of the first image-forming job and at least one page of the second image-forming job are different. For example, recording-medium transport directions of a last page of the first image-forming job and a first page of the second image-forming job are different; recording-medium transport directions of last partial pages of the first image-forming job and first partial pages of the second image-forming job are different; or recording-medium transport directions of a set page of the first image-forming job and a set page of the second image-forming job are different. For example, the set page of the first image-forming job may be a penultimate page, and the set page of the second image-forming job may be the first page; or the set page of the first image-forming job may be the last page, and the set page of the second image-forming job may be a second page. In some other embodiments, those skilled in the art may set another page number of the first image-forming job and/or the second image-forming job as the set page according to actual needs, which is not specifically limited herein.

That is, in some embodiments of the present disclosure, the recording-medium transport direction can be constrained by the recording-medium transport rule, so that the recording-medium transport directions of at least one page of the first image-forming job and at least one page of the second image-forming job are different. When there are recording medium with different transport directions in the first image-forming job and the second image-forming job, cross-arranged recording medium are generated in the consecutively outputted first image-forming job and the second image-forming job, and the user can easily distinguish the recording medium corresponding to each image-forming job with the cross-arranged recording medium.

It can be understood that when the cross-arranged recording medium are located at adjacent positions of the first image-forming job and the second image-forming job, it is more convenient for the user to distinguish the first image-forming job and the second image-forming job. Therefore, in some embodiments, the recording-medium transport directions are different at adjacent positions of the first image-forming job and the second image-forming job.

In order to achieve the above purpose, the embodiments of the present disclosure provide a variety of different ways of setting the recording-medium transport rule, which will be described below.

Figure 3:
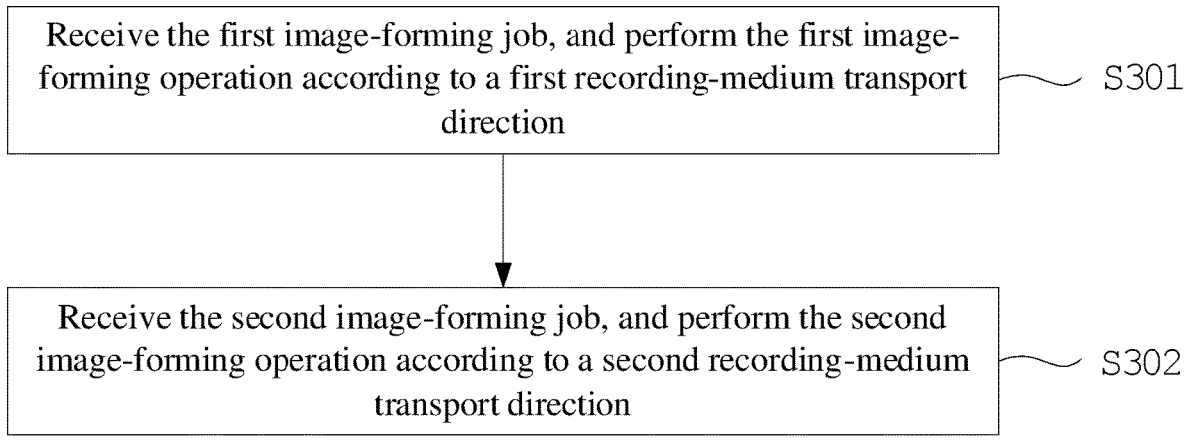
FIG. 3 is a schematic flow chart of another method for forming an image according to an embodiment of the present disclosure.

FIG. 3 is a schematic flow chart of another method for forming an image provided by the embodiments of the present disclosure, which can be applied to the image-forming systems shown in FIG. 1A or FIG. 1B. As shown in FIG. 3, the method mainly includes the following processes.

Process S301, receiving the first image-forming job, and performing the first image-forming operation according to a first recording-medium transport direction.

In some embodiments of the present disclosure, performing the first image-forming operation according to the first recording-medium transport direction is the first recording-medium transport rule. The recording medium involved in some embodiments of the present disclosure may be paper, and the recording-medium transport direction may be understood as the paper transport direction. Usually, a shape of the paper is a rectangle with different lengths of adjacent sides, i.e., the paper includes long sides and short sides, such as A4/A5/B4/B5 or other types of paper.

Figure 4:
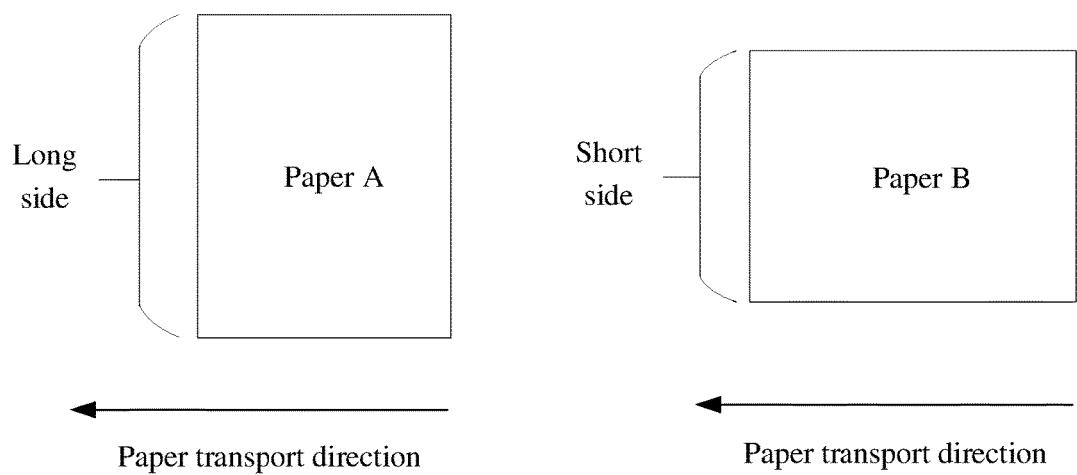
FIG. 4 is a schematic diagram showing paper transport directions according to an embodiment of the present disclosure.

FIG. 4 is a schematic diagram showing the paper transport directions provided by the embodiments of the present disclosure. As shown in FIG. 4, paper A is transported in a direction perpendicular to the long side, i.e., the paper A is transported in a direction of the short side; paper B is transported in a direction perpendicular to the short side, i.e., the paper B is transported in a direction of the long side.

In order to facilitate the distinction of the output papers corresponding to multiple image-forming jobs, different paper transport directions are used in different image-forming jobs in some embodiments of the present disclosure. After the first image-forming job "JOB #1" is received, the first image-forming operation of "JOB #1" may be performed according to the first recording-medium transport direction (first paper transport direction). That is, the paper transport direction is controlled according to the image-forming job.

In a possible implementation manner, the image-forming device is provided with at least two paper boxes, and the paper boxes are arranged in different directions, i.e., the input papers in the paper boxes are arranged in different directions. The image-forming device can select to use the input papers in a certain paper box to perform the image-forming operations. Direction of the input papers in the paper box affects the paper transport direction, which further affects stacking direction of the output papers on the paper discharge tray. Based on this principle, performing the first image-forming operation of "JOB #1" according to the first recording-medium transport direction includes, in some embodiments, selecting a first recording-medium storage device, and performing the first image-forming operation of "JOB #1" according to the first recording-medium transport direction. In some embodiments of the present disclosure, the recording medium is paper, then the first recording-medium storage device is a first paper box, and the first recording-medium transport direction is the first paper transport direction. That is, the first paper box is selected, and the first image-forming operation of "JOB #1" is performed according to the first paper transport direction. A storage direction of the papers in the first paper box corresponds to the first paper transport direction.

Figure 5A:
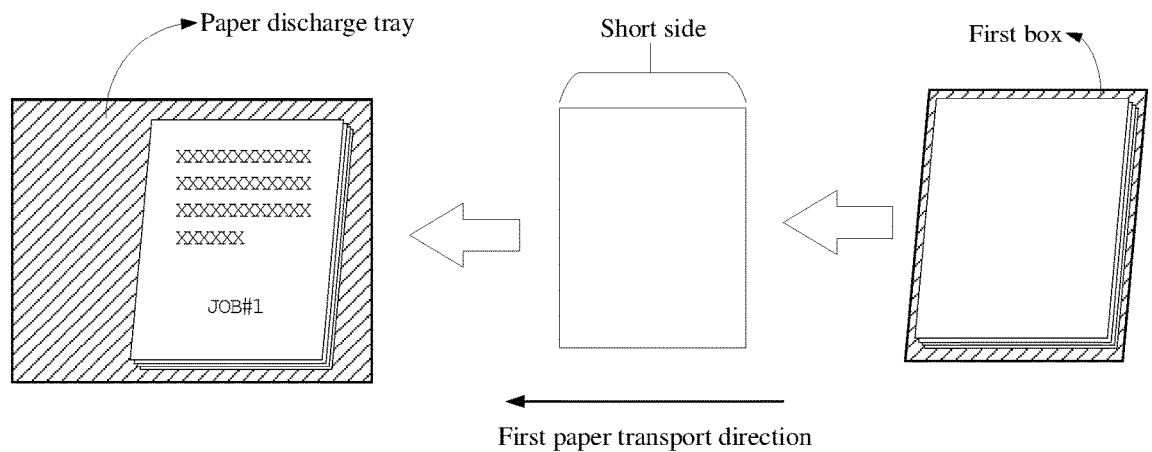
FIG. 5A is a schematic diagram showing a first paper transport direction according to an embodiment of the present disclosure.

FIG. 5A is a schematic diagram showing a first paper transport direction provided by the embodiments of the present disclosure. As shown in FIG. 5A, the first paper box is arranged vertically, and the input papers are also placed vertically in the first paper box. When the image-forming device selects the first paper box to perform the image-forming operations, papers are transported in the direction of the short side (vertical direction). After the image-forming operations are completed, the output papers are also stacked vertically on the paper discharge tray. It should be noted that "horizontal" or "vertical" are only relative concepts, and are described according to orientations shown in the figures in the embodiments of the present disclosure.

In a possible implementation manner, after receiving the first image-forming job "JOB #1", the image-forming device can determine by itself which paper box to select to feed paper, and it is only needed to ensure that setting direction of the paper box selected for the first image-forming job "JOB #1" is different from the subsequent second image-forming job "JOB #2".

In a possible implementation manner, the first image-forming job "JOB #1" also includes recording-medium storage device selection information, i.e., paper box selection information. The paper box selection information may be information set by the user, i.e., the user sets which paper box to select to feed paper. After receiving the first image-forming job "JOB #1", the image-forming device selects the first paper box according to the paper box selection information, and performs the first image-forming operation of "JOB #1" according to the first paper transport direction.

Process S302, receiving the second image-forming job, and performing the second image-forming operation according to a second recording-medium transport direction.

In some embodiments of the present disclosure, performing the second image-forming operation according to the second recording-medium transport direction is the second recording-medium transport rule.

After the first image-forming job "JOB #1" is completed, in order to avoid the output papers corresponding to the first image-forming job "JOB #1" and the second image-forming job "JOB #2" from being mixed together, the second image-forming operation of "JOB #2" is performed according to the second recording-medium transport direction. That is, the second image-forming operation of "JOB #2" is performed according to the second paper transport direction, which is different from the above-mentioned first paper transport direction.

Figure 5B:
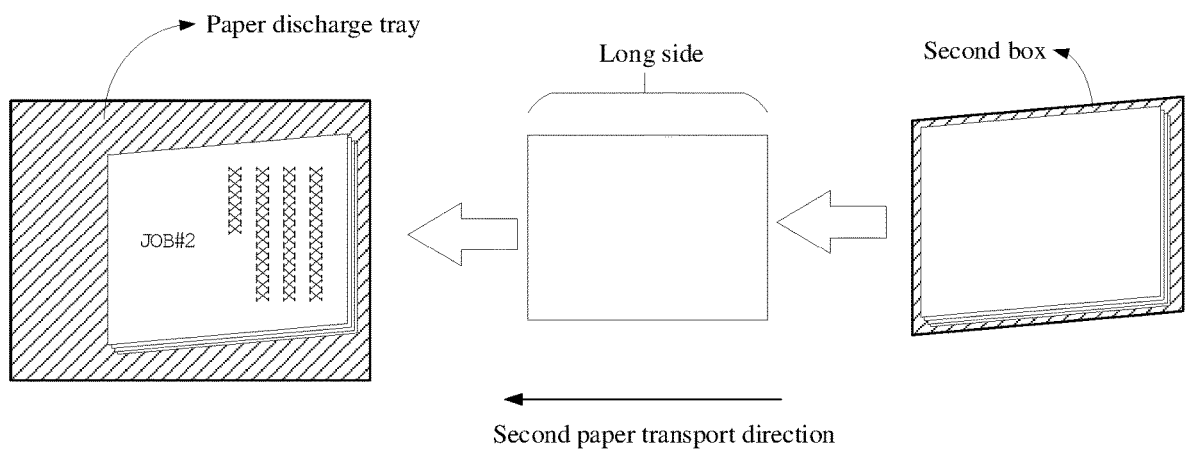
FIG. 5B is a schematic diagram showing a second paper transport direction according to an embodiment of the present disclosure.

FIG. 5B is a schematic diagram showing a second paper transport direction provided by the embodiments of the present disclosure. As shown in FIG. 5B, a second paper box is arranged horizontally, and the input papers are also placed horizontally in the second paper box. When the image-forming device selects the second paper box to perform the image-forming operations, papers are transported in the direction of the long side (horizontal direction). After the image-forming operations are completed, the output papers are also stacked horizontally on the paper discharge tray. It should be noted that "horizontal" or "vertical" are only relative concepts, and are described according to orientations shown in the figures in the embodiments of the present disclosure.

It should be noted that FIGS. 5A and 5B are only exemplary descriptions, and should not be taken as limitations of the protection scope of the present disclosure. For example, in some implementation manners, when the first paper box is arranged vertically, the papers may be transported in the direction of the long side; when the second paper box is arranged horizontally, the papers may be transported in the direction of the short side. As another example, in some implementation manners, when the first paper box is arranged vertically, the output papers are stacked horizontally on the paper discharge tray; when the second paper box is arranged horizontally, the output papers are stacked vertically on the paper discharge tray, which depends on setting manners of internal transport system of the image-forming device. However, it is clear that there is a definite correspondence between the direction of the input papers in the paper box and the stacking direction of the output papers on the paper discharge tray, so that the paper transport direction can be determined by selection of the paper box.

In a possible implementation manner, after receiving the second image-forming job "JOB #2", the image-forming device can determine by itself which paper box to select to feed paper, and it is only needed to ensure that setting direction of the paper box selected for the second image-forming job "JOB #2" is different from the first image-forming job "JOB #1".

In a possible implementation manner, the second image-forming job "JOB #2" also includes the recording-medium storage device selection information, i.e., the paper box selection information. The paper box selection information may be information set by the user, i.e., the user sets which paper box to select to feed paper. After receiving the second image-forming job "JOB #2", the image-forming device selects the second paper box according to the paper box selection information, and performs the second image-forming operation of "JOB #2" according to the second paper transport direction.

Figure 6:
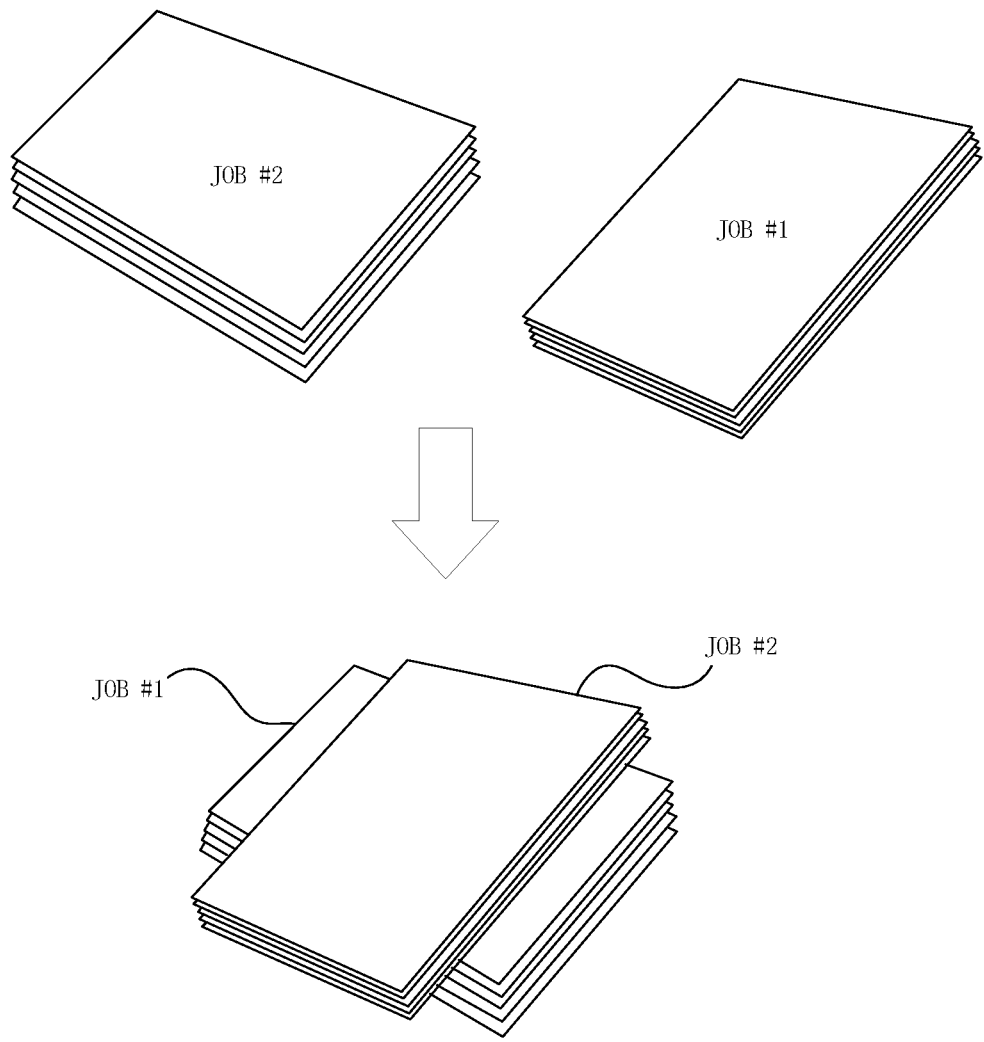
FIG. 6 is a schematic diagram showing a stacking manner of output papers according to an embodiment of the present disclosure.

FIG. 6 is a schematic diagram showing a stacking manner of the output papers provided by the embodiments of the present disclosure. As shown in FIG. 6, after the second image-forming job "JOB #2" is completed, the output papers corresponding to the first image-forming job "JOB #1" and the second image-forming job "JOB #2" are cross-stacked horizontally and vertically, and the user can easily distinguish the output papers corresponding to each image-forming job.

In some embodiments of the present disclosure, the output papers corresponding to the first image-forming job "JOB #1" and the second image-forming job "JOB #2" are stacked horizontally and vertically respectively, i.e., the first paper transport direction is perpendicular to the second paper transport direction. In some possible implementation manners, other angles may also be set between the first paper transport direction and the second paper transport direction, such as 30°, 60°, etc., which are not specifically limited herein.

In addition, in addition to the first paper box and the second paper box, there may be a greater number of the paper boxes in the image-forming device. The present disclosure does not limit the number of the paper boxes and types of the papers stored in the paper boxes. For example, there are five paper boxes set in the image-forming device, where papers such as A4/A5/B4/B5/letter are placed vertically in paper boxes "#01", "#02", and "#04", and papers such as A4/A5 are placed horizontally in paper boxes "#03" and "#05".

In the embodiments of the present disclosure, the paper transport directions are controlled to make the output papers corresponding to different image-forming jobs being cross-arranged in different directions, so that the user can easily distinguish the output papers corresponding to each image-forming job.

In a possible implementation manner, the above-mentioned first image-forming job and the second image-forming job may be different image-forming jobs sent by different control devices to the image-forming device (as in the application scenario shown in FIG. 1A), i.e., the image-forming jobs sent by different control devices can be distinguished. Or the above-mentioned first image-forming job and the second image-forming job are different image-forming jobs sent by the same control device to the image-forming device (as in the application scenario shown in FIG. 1B), i.e., the image-forming jobs sent by the same control device can be distinguished.

In a possible implementation manner, the above-mentioned first image-forming job and the second image-forming job may be different image-forming jobs sent by different users to the image-forming device, i.e., the image-forming jobs sent by different users can be distinguished. Or the above-mentioned first image-forming job and the second image-forming job are different image-forming jobs sent by the same user to the image-forming device, i.e., the image-forming jobs sent by the same user can be distinguished.

For ease of understanding, the technical solutions provided by the embodiments of the present disclosure will be described in detail below in conjunction with some implementation manners.

Figure 7:
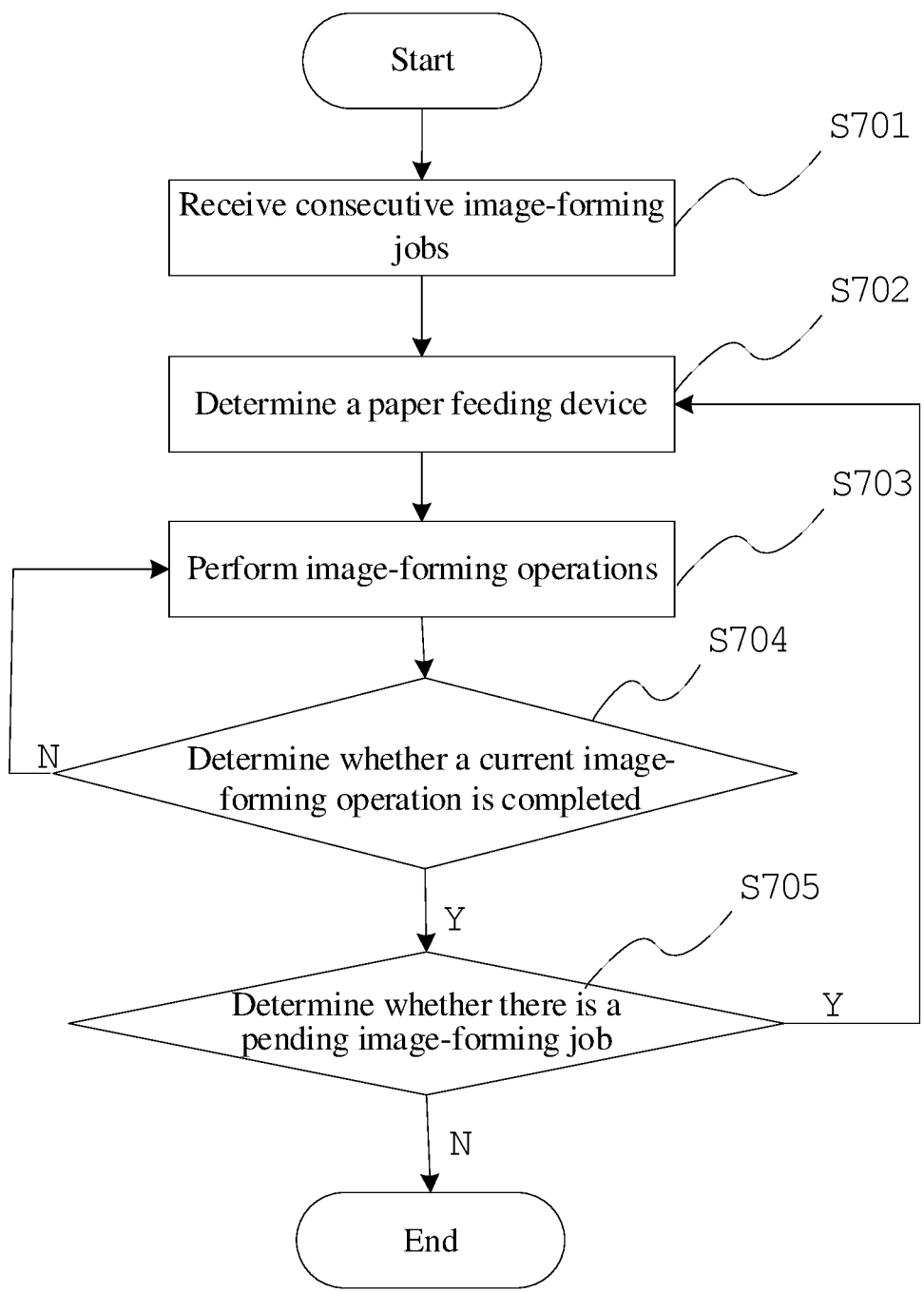
FIG. 7 is a schematic flow chart of another method for forming an image according to an embodiment of the present disclosure.

FIG. 7 is a schematic flow chart of another method for forming an image provided by the embodiments of the present disclosure, which can be applied to the image-forming systems shown in FIG. 1A or FIG. 1B. As shown in FIG. 7, the method mainly includes the following processes.

Process S701, receiving consecutive image-forming jobs.

In some embodiments, the image-forming jobs include multiple image-forming jobs sent by different users (or different control devices) such as shown in FIG. 1A, or include multiple image-forming jobs sent by the same user (or the same control device) such as shown in FIG. 1B. The multiple image-forming jobs are initially indicated by using different identifications such as "JOB #1", "JOB #2", . . . , or "JOB #N". Different job identifications such as "JOB #1", "JOB #2", . . . , or "JOB #N" may also be created when a print driver receives image-forming job data to distinguish each image-forming job, image-forming jobs for each user, or image-forming jobs sent by each control device. In addition, different job identifications such as "JOB #1", "JOB #2", . . . , or "JOB #N" may also be created for image-forming jobs sent by each user, image-forming jobs sent by each control device, or each image-forming job when the image-forming device receives the image-forming jobs from the control devices to distinguish the image-forming jobs.

Process S702, determining a paper feeding device.

In some embodiments, determining a paper feeding device is to select which paper box is used to feed paper. In a possible implementation manner, the image-forming job includes image-forming attribute information that may include the paper box selection information, and the image-forming device may determine the paper feeding device according to the paper box selection information.

For example, user 1 sets parameters of the image-forming job before issuing the image-forming job "JOB #1", and selects paper box "#01" and "A4" (corresponding to A4 long-side feeding). The user 1 sets the parameters of the image-forming job before issuing the image-forming job "JOB #2", and selects paper box "#03" and "A4" (corresponding to A4 short-side feeding). Correspondingly, the paper box "#01" is selected as the paper feeding device according to image-forming attributes "#01" and "A4" of the image-forming job identified as "JOB #1". The paper box "#03" is selected as the paper feeding device according to image-forming attributes "#03" and "A4" of the image-forming job identified as "JOB #2".

As another example, when the same user issues multiple image-forming jobs, or different users issue multiple image-forming jobs, the image-forming device automatically selects paper boxes with different setting directions as the paper feeding device for adjacent image-forming jobs according to attribute settings of different users or different image-forming jobs.

Process S703, the image-forming device performs the image-forming operations.

In some embodiments, the image-forming operations may be sequentially performed according to sequence of the image-forming jobs received consecutively. For example, image-forming operations of "JOB #1", "JOB #2", . . . , and "JOB #N" are sequentially performed. The image-forming operations may also be performed according to user needs.

Process S704, the image-forming device determines whether a current image-forming operation is completed.

If the current image-forming operation is completed, process S705 is performed; if the current image-forming operation is not completed, process S703 is performed.

Figure 8:
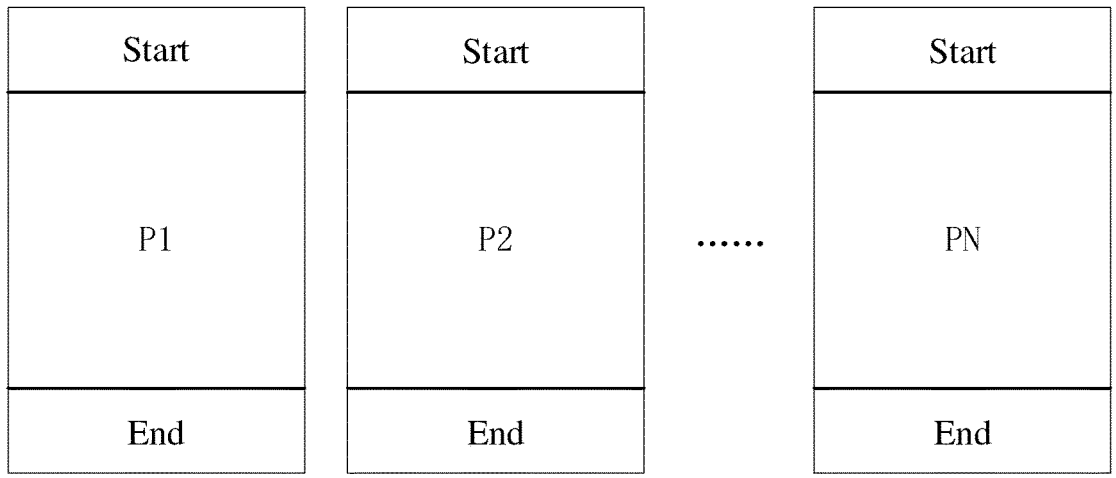
FIG. 8 is a schematic diagram showing job identifications of an image-forming job according to an embodiment of the present disclosure.

For the issued image-forming job, each page of the image-forming job can be distinguished by using job separators or job identifications. The job identifications are taken as an example herein, as shown in FIG. 8, and for each page of print data, there is a corresponding job start identification (start) and job end identification (end). The image-forming device can identify each page of the image-forming job based on end information identifying the job (the job end identification). That is, the job end identification of the corresponding page is identified with the completion of the image-forming operation of each page of the image-forming job, so that it is determined that image-forming of current page is completed. Similarly, for each print job, there is a corresponding job end flag, and the image-forming device determines the completion of the image-forming operations corresponding to each job by identifying the job end flag.

Process S705, determining whether there is a pending image-forming job.

If there is a pending image-forming job, process S702 is performed again; if there is no pending image-forming job, the image-forming operations are ended. If there is a pending image-forming job, data and image-forming attribute information of the pending image-forming job are obtained, and process S702 is performed to determine the paper feeding device. Here, the image-forming device determines that the paper feeding device is different from the paper feeding device of a previous image-forming job according to the image-forming attribute information, and particularly determines that the paper feeding device is with different paper transport direction from the previous image-forming job.

For example, the paper feeding device determined to perform the image-forming operations is the paper box "#01" (horizontal feeding) according to the image-forming attribute information of a previous image-forming job "JOB #1". After the image-forming device completes the pervious image-forming job "JOB #1", and it is determined that there is a pending image-forming job "JOB #2", then it is determined that the paper feeding device is with different paper transport direction from the previous image-forming job "JOB #1", such as paper box "#03" (vertical feeding). In this way, after the image-forming device completes the image-forming operations and outputs the image-forming job "JOB #2", two adjacent image-forming jobs obtained from the paper discharge tray of the image-forming device are the image-forming jobs that are cross-output horizontally and vertically, respectively, as shown in FIG. 6.

In addition to the above implementation manner, in order to facilitate distinction of different image-forming jobs, the paper transport direction can be adjusted only for some papers in each image-forming job, so that paper intervals in different directions are formed between two adjacent image-forming jobs, and the user can easily distinguish the output papers corresponding to each image-forming job.

Figure 9:
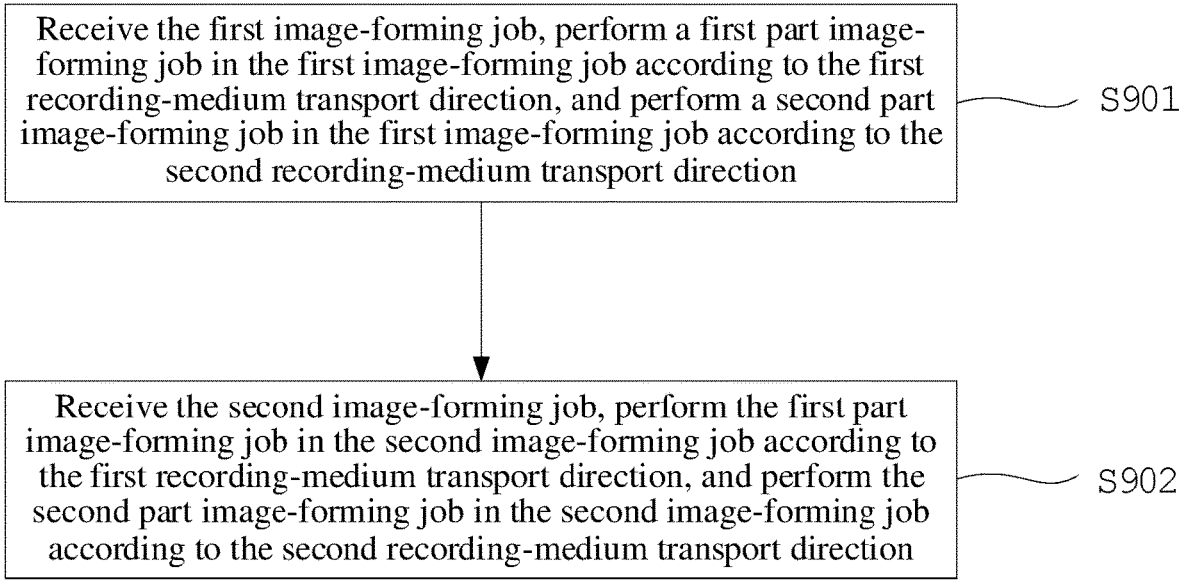
FIG. 9 is a schematic flow chart of another method for forming an image according to an embodiment of the present disclosure.

FIG. 9 is a schematic flow chart of another method for forming an image provided by the embodiments of the present disclosure, which can be applied to the image-forming systems shown in FIG. 1A or FIG. 1B. As shown in FIG. 9, the method mainly includes the following processes.

Process S901, receiving the first image-forming job, performing a first part image-forming job in the first image-forming job according to the first recording-medium transport direction, and performing a second part image-forming job in the first image-forming job according to the second recording-medium transport direction.

In some embodiments of the present disclosure, performing the first part image-forming job in the first image-forming job according to the first recording-medium transport direction and performing the second part image-forming job in the first image-forming job according to the second recording-medium transport direction is the first recording-medium transport rule. That is, in some embodiments of the present disclosure, the first image-forming job is performed in two parts, and different paper transport directions are used in the two parts.

In a possible implementation manner, there are N pages of print data in the first image-forming job, where the print data of page 1 to page N−1 is used as the first part image-forming job, and the papers are transported horizontally; the print data of page N (last page) is used as the second part image-forming job, and the paper is transported vertically.

In another possible implementation manner, there are N pages of print data in the first image-forming job, where the print data of page 1 to page K (first K pages, where K<N) is used as the first part image-forming job, and the papers are transported horizontally; the print data of page K+1 to page N (last N−K pages) is used as the second part image-forming job, and the papers are transported vertically. For example, there are 10 pages of print data in the first image-forming job, where the print data of page 1 to page 7 (first 7 pages) is used as the first part image-forming job, and the papers are transported horizontally; the print data of page 8 to page 10 (last 3 pages) is used as the second part image-forming job, and the papers are transported vertically.

Process S902, receiving the second image-forming job, performing the first part image-forming job in the second image-forming job according to the first recording-medium transport direction, and performing the second part image-forming job in the second image-forming job according to the second recording-medium transport direction.

In some embodiments of the present disclosure, performing the first part image-forming job in the second image-forming job according to the first recording-medium transport direction and performing the second part image-forming job in the second image-forming job according to the second recording-medium transport direction is the second recording-medium transport rule. That is, in some embodiments of the present disclosure, the second image-forming job is performed in two parts, and different paper transport directions are used in the two parts.

In a possible implementation manner, there are M pages of print data in the second image-forming job, where the print data of page 1 to page M−1 is used as the first part image-forming job, and the papers are transported horizontally; the print data of page M (last page) is used as the second part image-forming job, and the paper is transported vertically.

In another possible implementation manner, there are M pages of print data in the second image-forming job, where the print data of page 1 to page H (first H pages, where H<M) is used as the first part image-forming job, and the papers are transported horizontally; the print data of page H+1 to page M (last M-H pages) is used as the second part image-forming job, and the papers are transported vertically. For example, there are 10 pages of print data in the second image-forming job, where the print data of page 1 to page 2 (first 2 pages) is used as the first part image-forming job, and the papers are transported horizontally; the print data of page 3 to page 10 (last 8 pages) is used as the second part image-forming job, and the papers are transported vertically.

Figure 10:
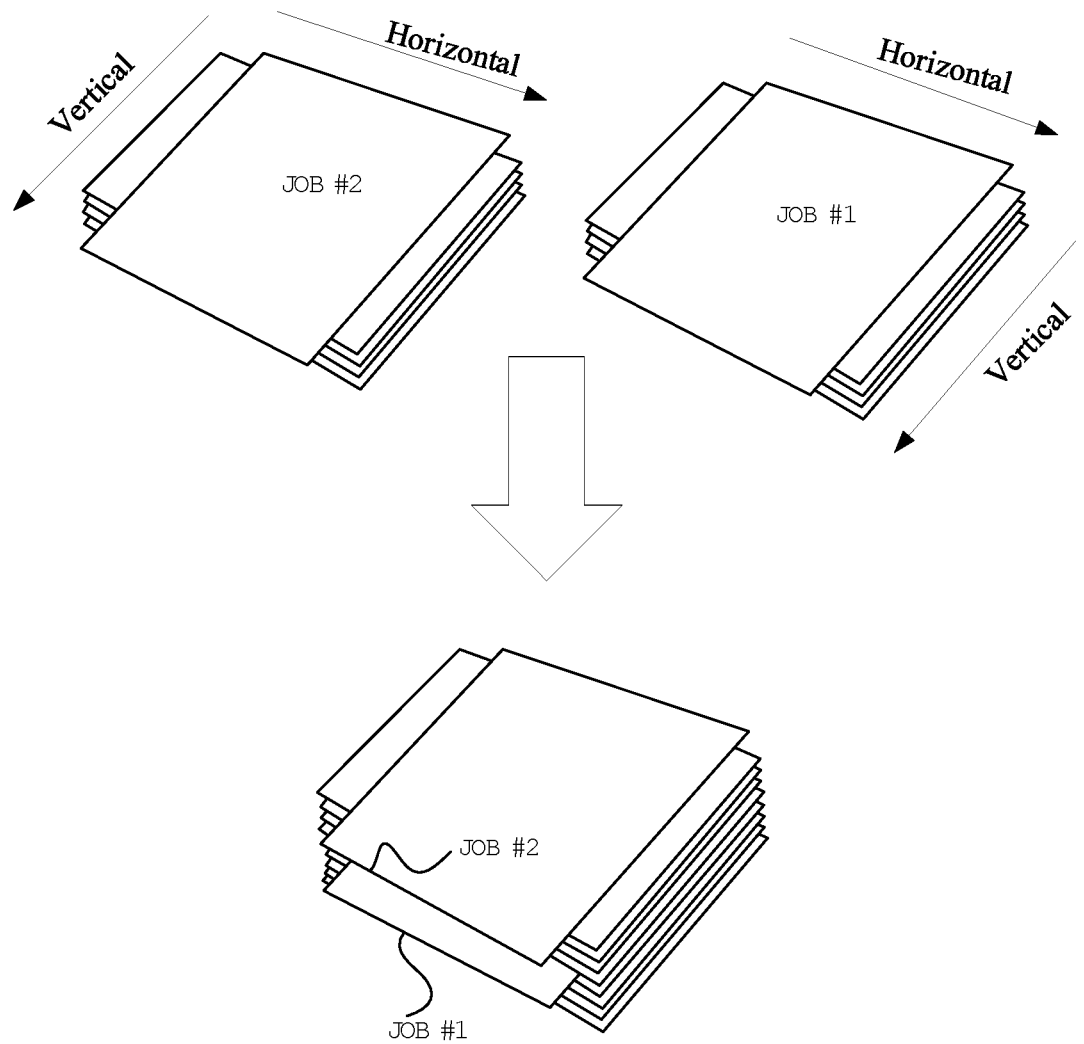
FIG. 10 is a schematic diagram showing a stacking manner of output papers according to an embodiment of the present disclosure.

FIG. 10 is a schematic diagram showing a stacking manner of the output papers provided by the embodiments of the present disclosure. In FIG. 10, it is assumed that there are N pages of print data in the first image-forming job "JOB #1", and there are M pages of print data in the second image-forming job "JOB #2". After the first image-forming job "JOB #1" is completed, the output papers of page 1 to page N−1 in the first image-forming job "JOB #1" are arranged horizontally, and the output paper of page N (last page of the output papers) is arranged vertically. After the second image-forming job "JOB #2" is completed, the output papers of page 1 to page M−1 in the second image-forming job "JOB #2" are arranged horizontally, and the output paper of page M (last page of the output papers) is arranged vertically. It can be understood that the first image-forming job and the second image-forming job can be separated by the output paper of page N in the first image-forming job "JOB #1". Similarly, if there is a third image-forming job "JOB #3" subsequently, the second image-forming job and the third image-forming job can be separated by the output paper of page M in the second image-forming job "JOB #2".

Figure 11:
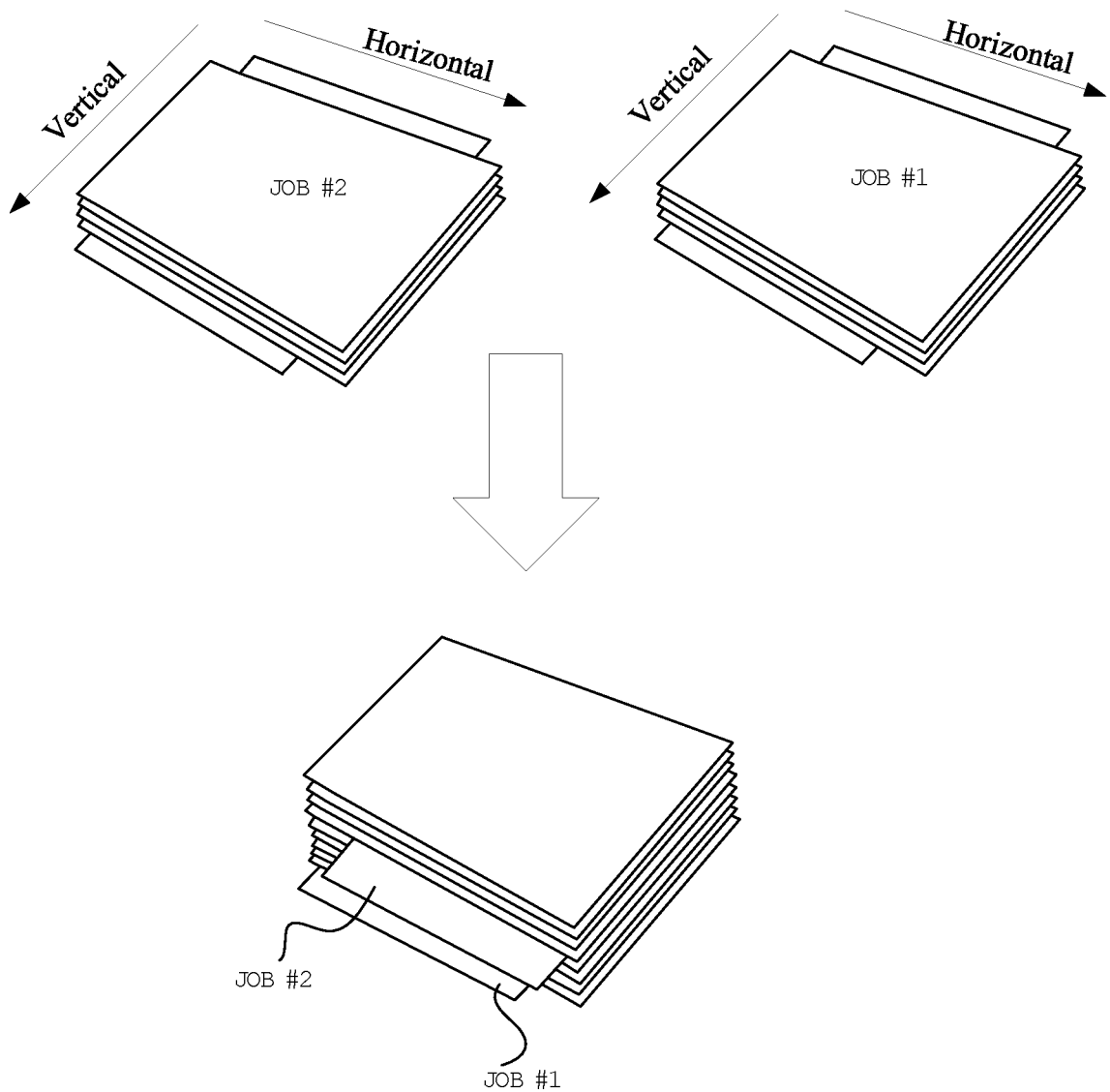
FIG. 11 is a schematic diagram showing another stacking manner of output papers according to an embodiment of the present disclosure.

FIG. 11 is a schematic diagram showing another stacking manner of the output papers provided by the embodiments of the present disclosure. In FIG. 11, it is assumed that there are N pages of print data in the first image-forming job "JOB #1", and there are M pages of print data in the second image-forming job "JOB #2". After the first image-forming job "JOB #1" is completed, first page of the output papers in the first image-forming job "JOB #1" is arranged vertically, and the output papers of page 2 to page N are arranged horizontally. After the second image-forming job "JOB #2" is completed, first page of the output papers in the second image-forming job "JOB #2" is arranged vertically, and the output papers of page 2 to page N are arranged horizontally. It can be understood that the first image-forming job and the second image-forming job can be separated by the first page of the output papers in the second image-forming job "JOB #2".

To sum up, in an application scenario shown in FIG. 10, the last page of the output papers in the image-forming job is a separator page of two adjacent image-forming jobs; in an application scenario shown in FIG. 11, the first page of the output papers is the separator page of two adjacent image-forming jobs. In the above embodiments, number of the separator pages is one page for illustration, and those skilled in the art can also set the separator pages to more than two pages, such as two pages, three pages, four pages, etc., according to actual needs, which is not specifically limited herein. In other words, those skilled in the art can flexibly configure numbers of the output papers corresponding to the first part image-forming job and the second part image-forming job, which is not specifically limited herein.

As for other content of the embodiments, reference may be made to the description of the embodiments shown in FIG. 3, which will not be repeated herein.

In a possible implementation manner, the above process S901 can be divided into two situations: if the first image-forming job is not a first received image-forming job, the first part image-forming job in the first image-forming job is performed according to the first recording-medium transport direction, and the second part image-forming job in the first image-forming job is performed according to the second recording-medium transport direction; if the first image-forming job is the first received image-forming job, the first image-forming job is performed according to the first recording-medium transport direction or the second recording-medium transport direction, where the recording-medium transport direction to perform the first image-forming job is determined according to the recording-medium transport direction to perform the previous image-forming job. For example, in FIG. 11, the first image-forming job "JOB #1" is the first received image-forming job (there is no other image-forming job that needs to be separated before the first page of the first image-forming job "JOB #1"), the first page of the output papers in the first image-forming job "JOB #1" can also be arranged horizontally, i.e., all the output papers in the first image-forming job "JOB #1" are arranged horizontally. With this method, user's sorting work for the first image-forming job "JOB #1" (sorting the output papers in the first image-forming job "JOB #1" in different directions into the same direction) can also be reduced. For example, if the first image-forming job is the first received image-forming job, the first image-forming job is performed according to the first recording-medium transport direction, the first part image-forming job in the second image-forming job is performed according to the second recording-medium transport direction, and the second part image-forming job in the second image-forming job is performed according to the first recording-medium transport direction; if the first image-forming job is not the first received image-forming job, the first part image-forming job in the first image-forming job is performed according to the first recording-medium transport direction, and the second part image-forming job in the first image-forming job is performed according to the second recording-medium transport direction.

Similarly, the above process S902 can be divided into two situations: if the second image-forming job is not a last received image-forming job, the first part image-forming job in the second image-forming job is performed according to the first recording-medium transport direction, and the second part image-forming job in the second image-forming job is performed according to the second recording-medium transport direction; if the second image-forming job is the last received image-forming job, the second image-forming job is performed according to the first recording-medium transport direction or the second recording-medium transport direction, where the recording-medium transport direction to perform the second image-forming job is determined according to the recording-medium transport direction to perform the previous image-forming job. For example, in FIG. 10, the second image-forming job "JOB #2" is the last received image-forming job (there is no other image-forming job that needs to be separated after the last page of the second image-forming job "JOB #2"), the last page of the output papers in the second image-forming job "JOB #2" can also be arranged horizontally, i.e., all the output papers in the second image-forming job "JOB #2" are arranged horizontally. With this method, user's sorting work for the second image-forming job "JOB #2" (sorting the output papers in the second image-forming job "JOB #2" in different directions into the same direction) can also be reduced.

For ease of understanding, the technical solutions provided by the embodiments of the present disclosure will be described in detail below in conjunction with some implementation manners.

Figure 12:
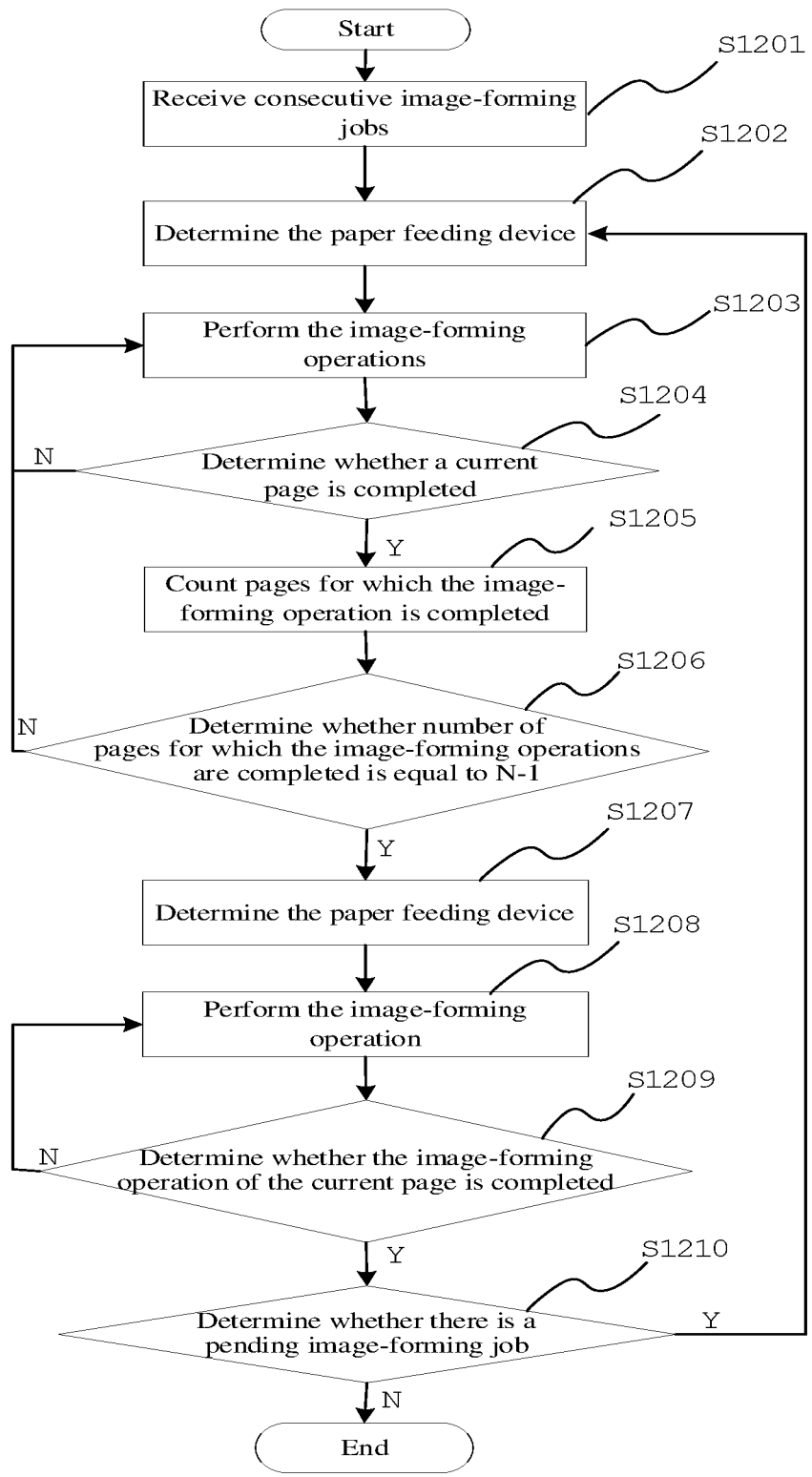
FIG. 12 is a schematic flow chart of another method for forming an image according to an embodiment of the present disclosure.

FIG. 12 is a schematic flow chart of another method for forming an image provided by the embodiments of the present disclosure, which can be applied to the image-forming systems shown in FIG. 1A or FIG. 1B. As shown in FIG. 12, the method mainly includes the following processes.

Process S1201, receiving consecutive image-forming jobs.

Process S1202, determining the paper feeding device.

Process S1203, the image-forming device performs the image-forming operations.

As for specific content of processes S1201-S1203, reference can be made to the description of processes S701-S703 in the embodiments shown in FIG. 7, which will not be repeated herein.

Process S1204, the image-forming device determines whether a current page is completed.

For example, there are N pages of data in a currently performed image-forming job, and the image-forming device sequentially performs the image-forming operation for each page of data. During performance of the image-forming operations, the image-forming device determines whether the current page is completed, i.e., determines whether printing of the current page is completed. If the current page is completed, process S1205 is performed; if the current page is not completed, process S1203 is performed again to continue the image-forming operation of the current page. As shown in FIG. 8, for each page of print data, there is a corresponding job start identification (start) and job end identification (end). The image-forming device can identify each page of the image-forming job based on the end information identifying the job (the job end identification). That is, the job end identification of the corresponding page is identified with the completion of the image-forming operation of each page of the image-forming job, so that it is determined that the image-forming of current page is completed.

Process S1205, counting the pages for which the image forming operation is completed.

In some embodiments, a counter may be set. In an initial state, a count value of the counter is 0, and the counter is incremented by 1 every time the image-forming operation of one page is completed, so as to count number of pages for which the image-forming operations are completed.

Process S1206, determining whether the number of pages for which the image-forming operations are completed is equal to N−1.

In some embodiments of the present disclosure, there are N pages of data in the current image-forming job, and determining whether the number of pages for which the image-forming operations are completed is equal to N−1 is to determine whether the page on which the image-forming operation is performed is a penultimate page of the current image-forming job. If it is the penultimate page of the current image-forming job, process S1207 is performed; if it is not the penultimate page of the current image-forming job, process S1203 is performed again.

Process S1207, determining the paper feeding device.

In a case where the image-forming operations are completed for N−1 pages of the current image-forming job, the paper feeding device is re-determined for the last page (Nth page). The re-determined paper feeding device is different from the paper feeding device of the previously completed image-forming operations for N−1 pages, and a paper arrangement direction in the paper feeding device determined for the Nth page is different from the paper arrangement direction in the paper feeding device of the previously completed image-forming operations for N−1 pages.

For example, a 10-page image-forming job and the image-forming attribute information hereof are received, and the image-forming attribute information includes the paper box selection information. In an initial state, the image-forming device may determine that the paper feeding device is the paper box "#01" (horizontal A4) according to the paper box selection information. After the image-forming device completes the image-forming operations of 9 pages of data, the paper box "#03" (vertical A4) different from the previous 9 pages is re-determined to be the paper feeding device for the 10th page of data before the image-forming operation according to the paper box selection information.

Process S1208, the image-forming device performs the image-forming operation.

After the paper feeding device for the Nth page is re-determined, the image-forming device continues to perform the image-forming operation of the Nth page of data.

Process S1209, the image-forming device determines whether the image-forming operation of the current page is completed.

In some embodiments, the image-forming device determines whether the image-forming operation of the Nth page is completed. If the image-forming operation of the Nth page is completed, it means that all image-forming operations of the current image-forming job are completed, and process S1210 is performed. If it is not completed, process S1208 is performed again. In some other embodiments, the image-forming device determines whether the image-forming operations of the current job are completed according to the job end flag. If the image-forming job is completed, process S1210 is performed. If it is not completed, process S1208 is performed again.

Process S1210, determining whether there is a pending image-forming job.

If there is a pending image-forming job, process S1202 is performed again; if there is no pending image-forming job, all operations are ended.

For example, when a 10-page first image-forming job "JOB #1" is obtained, the image-forming device increments page count of the completed image-forming operations by 1 by identifying the job identifications of each page in the first image-forming job "JOB #1". When the image-forming device completes image-forming operations of 9 pages, number of the page count is N−1=9. Then for the image-forming operation of 10th page, the paper feeding device is re-determined, and the paper feeding device is different from the determined paper feeding device for the previous 9 pages, especially the paper arrangement direction in the paper feeding device for the 10th page is different from that of the previous 9 pages, so that the image-forming operation is performed for data of page 10 according to paper feeding device for the 10th page. After the image-forming operation of data of page 10 is completed, it is further determined whether there is a next pending image-forming job. If there is a pending second image-forming job "JOB #2", then the paper feeding device is re-determined again according to the second image-forming job "JOB #2" and the image-forming attribute information thereof. For the re-determined paper feeding device, the paper arrangement direction is different form the paper arrangement direction in the paper feeding device determined for the 10th page of the first image-forming job "JOB #1, and thereby the papers are transported from the paper feeding device to perform the image-forming operations.

For example, the first image-forming job "JOB #1" with 10 pages of data determines that the paper feeding device for data of page 1 to page 9 is the paper box "#01" (horizontal A4) according to the image forming attribute information, and the re-determined paper feeding device for the last page (page 10) is paper box "#03" (vertical A4). For the pending second image-forming job "JOB #2", the paper feeding device re-determined again is the paper box "#02" (horizontal A4) that is different from the paper feeding device for the last page of the first image-forming job "JOB #1". In this way, for each image-forming job, the paper feeding device determined for the last page is different from other pages, so that the arrangement direction of the last page of the output papers is different from that of other output papers, and each image-forming job can be easily distinguished. Similarly, to distinguish for each user, the direction of the last page of the output papers in the last image-forming job of each user is set to be different from that of other output papers, so that the image-forming jobs for each user can be easily distinguished.

In a possible implementation manner, when it is determined that the number of pages for which the image-forming operations are completed is equal to N−1 in process S1206, process S1210 is performed to determine whether there is a pending image-forming job. If there is a pending image-forming job, process S1207 is performed to determine the paper feeding device, and processes S1208 and S1209 are performed in sequence to complete the image-forming job; if there is no pending image-forming job, the image-forming operations are continued until the image-forming job is completed. An output direction of the last page of the image-forming job is different from that of other pages of the image-forming job when there is a pending print job, so that processing operations on the last page can be reduced for the last image-forming job, and it is not needed to re-select the paper feeding device for operations. A particular example is that the output direction of last few pages of an image-forming job is different from the output direction of the previously outputted pages, such as that the output direction of the last 3 pages of a 10-page image-forming job is different from the output direction of the previous 7 pages. When it is determined that the number of pages for which the image-forming operations are completed is equal to 7 in process S1206, process S1210 is performed to determine whether there is a pending image-forming job. If there is a pending image-forming job, the paper feeding device corresponding to the last 3 pages is re-determined, and the image forming operations are performed until it is determined that the image-forming job is completed; if there is no pending image-forming job, the previously determined paper feeding device is used, and the image-forming operations are performed normally until the image-forming job is completed. An output direction of the last few pages of the image-forming job is different from that of other pages of the image-forming job when there is a pending print job, so that processing operations on the last few pages can be reduced for the last image-forming job, and it is not needed to re-select the paper feeding device for repeated operations.

In a possible implementation manner, the paper feeding device determined for the first page is different from other pages, so that the arrangement direction of the first page of the output papers is different from that of other output papers, and each image-forming job can be easily distinguished. Below is a detailed description in conjunction with the accompanying drawings.

Figure 13:
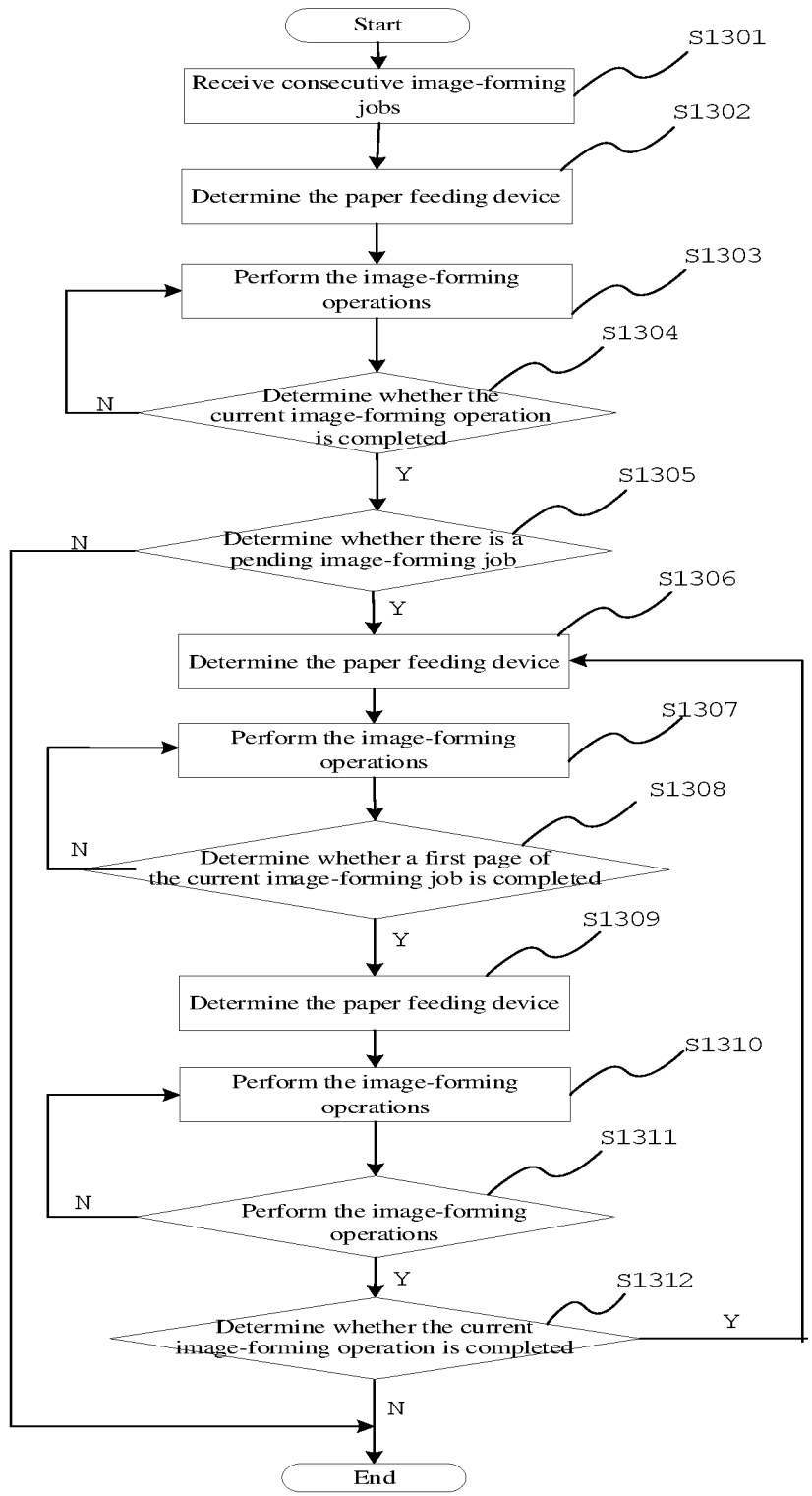
FIG. 13 is a schematic flow chart of another method for forming an image according to an embodiment of the present disclosure.

FIG. 13 is a schematic flow chart of another method for forming an image provided by the embodiments of the present disclosure, which can be applied to the image-forming systems shown in FIG. 1A or FIG. 1B. As shown in FIG. 13, the method mainly includes the following processes.

Process S1301, receiving consecutive image-forming jobs.

Process S1302, determining the paper feeding device.

Process S1303, the image-forming device performs the image-forming operations.

As for specific content of processes S1301-S1303, reference can be made to the description of processes S1201-S1203 in the embodiments shown in FIG. 12, which will not be repeated herein.

Process S1304, the image-forming device determines whether the current image-forming operation is completed.

If it is determined that the current image-forming operation is completed, process S1305 is performed; otherwise, process S1303 is performed again to continue the image-forming operations of the current image-forming job.

Process S1305, the image-forming device determines whether there is a pending image-forming job.

If there is a pending image-forming job, process S1306 is performed; otherwise, the image-forming operations are ended.

Process S1306, determining the paper feeding device.

In a case where the previous image-forming job (such as the first image-forming job "JOB #1") is completed and there is a pending image-forming job (such as the second image-forming job "JOB #2"), the paper feeding device is re-determined. The paper feeding device re-determined for the second image-forming job "JOB #2" is different from the paper feeding device of the first image-forming job "JOB #1", and is a paper feeding device with different paper arrangement direction in some embodiments.

Process S1307, the image-forming device performs the image-forming operations.

The image-forming device starts to perform the image-forming operation of the first page of the second image-forming job "JOB #2".

Process S1308, the image-forming device determines whether the first page of the current image-forming job is completed.

In some embodiments, there is job end identification for each page of the image-forming job, and it can be determined whether the image-forming operation of the first page of the current image-forming job is completed according to the job end identification of the first page. For example, the current image-forming job is the second image-forming job "JOB #2", and it is determined whether the image-forming operation of the first page of the second image-forming job "JOB #2" is completed. If the image-forming operation of the first page of the second image-forming job "JOB #2" is completed, process S1309 is performed; otherwise, process S1307 is performed again.

Process S1309, determining the paper feeding device.

In a case where it is determined that the image-forming operation of the first page is completed, the paper feeding device is re-determined from the second page. The re-determined paper feeding device is a paper feeding device different from the first page, and is a paper feeding device with different paper arrangement direction in some embodiments.

Process S1310, the image-forming device performs the image-forming operations.

For example, the current image-forming job is the second image-forming job "JOB #2", and the image-forming operations are performed from the second page of the second image-forming job "JOB #2".

Process S1311, the image-forming device determines whether the current image-forming operation is completed.

For example, the current image-forming job is the second image-forming job "JOB #2", and it is determined whether the second image-forming job "JOB #2" is completed. If the second image-forming job "JOB #2" is completed, process S1312 is performed; otherwise, process S1310 to performed again to continue the image-forming operations of the second image-forming job "JOB #2".

Process S1312, the image-forming device determines whether there is a pending image-forming job.

If there is a pending image-forming job, process S1306 is performed again; if there is no pending image-forming job, all the operations are ended.

In some embodiments of the present disclosure, the paper feeding device determined for the first page of a subsequent image-forming job except the first image-forming job, such as the second image-forming job, the third image-forming job, . . . , or the Nth image-forming job, is different from other pages, so that the arrangement direction of the first page of the output papers is different from that of other output papers, and each image-forming job can be easily distinguished by the first page of the subsequent image-forming job except the first image-forming job.

In a possible implementation manner, the paper feeding device determined for the first page is different from other pages, so that the arrangement direction of the first page of the output papers is different from that of other output papers, and each image-forming job can be easily distinguished. Below is a detailed description in conjunction with the accompanying drawings.

Figure 14:
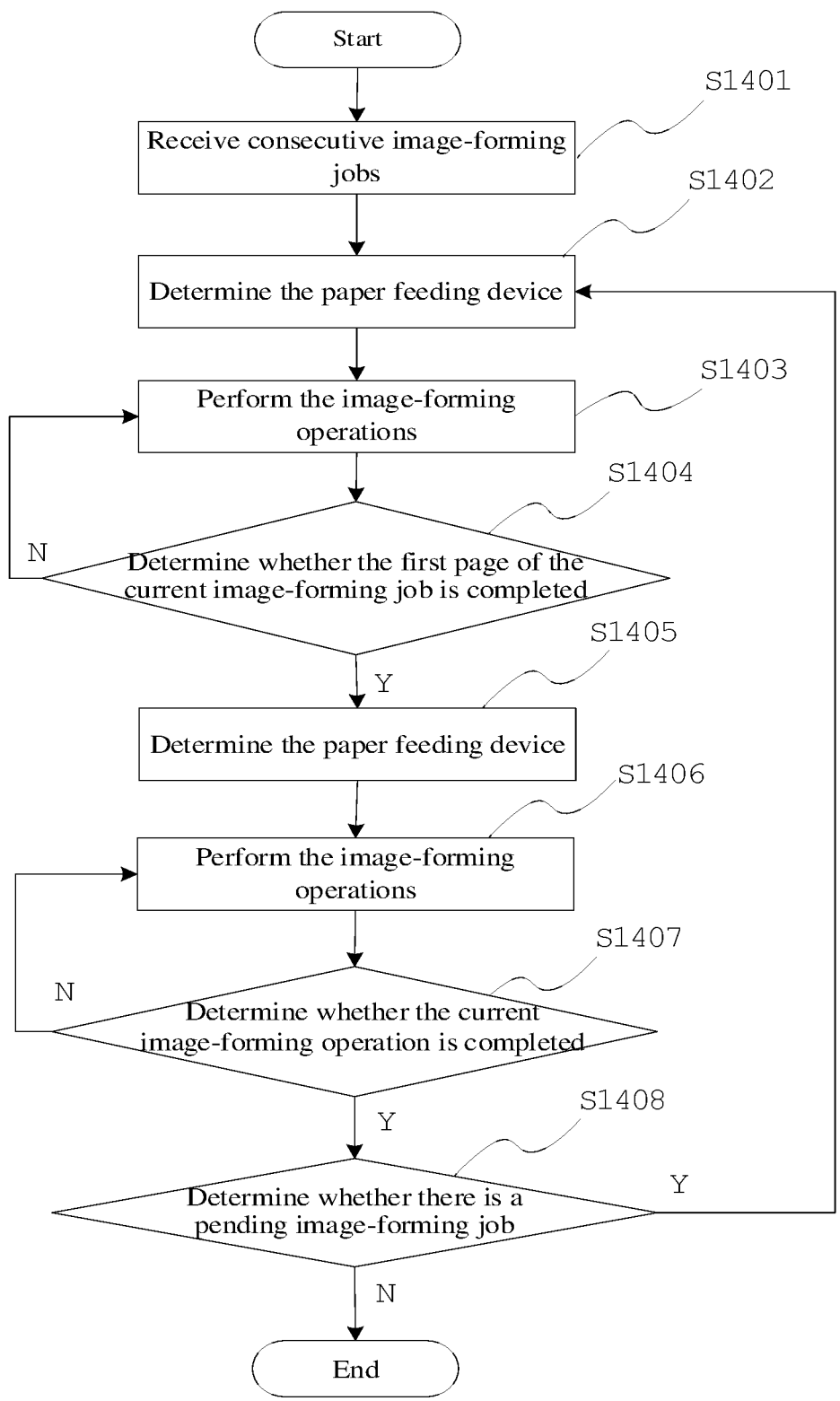
FIG. 14 is a schematic flow chart of another method for forming an image according to an embodiment of the present disclosure.

FIG. 14 is a schematic flow chart of another method for forming an image provided by the embodiments of the present disclosure, which can be applied to the image-forming systems shown in FIG. 1A or FIG. 1B. As shown in FIG. 14, the method mainly includes the following processes.

As for specific content of processes S1401-S1403, reference can be made to the description of processes S1201-S1203 in the embodiments shown in FIG. 12, which will not be repeated herein.

Process S1404, the image-forming device determines whether the first page of the current image-forming job is completed.

The image-forming device determines whether the image-forming operation of the first page of the current image-forming job is completed, and if it is determines that the image-forming operation of the first page of the current image-forming job is completed, process S1405 is performed; otherwise, process S1403 is performed again to continue the image-forming operations of the current image-forming job.

In some embodiments, there is job end identification for each page of the image-forming job, and it can be determined whether the image-forming operation of the first page of the current image-forming job is completed according to the job end identification of the first page. For example, the current image-forming job is the first image-forming job "JOB #1", and it can be determined whether the image-forming operation of the first page of the first image-forming job "JOB #1" is completed by identifying the job end identification of the first page of the first image-forming job "JOB #1".

Process S1405, determining the paper feeding device.

In a case where the image-forming operation of the first page of the current image-forming job (such as the first image-forming job "JOB #1") is completed, the paper feeding device is re-determined for pages other than the first page of the current first image-forming job "JOB #1". In some embodiments, the re-determined paper feeding device for pages other than the first page of the first image-forming job "JOB #1" is a paper feeding device different from the paper feeding device for the first page of the first image-forming job "JOB #1", and is a paper feeding device with different paper arrangement direction.

Process S1406, the image-forming device performs the image-forming operations.

The image-forming device uses the re-determined paper feeding device with different paper arrangement direction from the paper feeding device for the first page of the first image-forming job "JOB #1" to perform the image-forming operations of the current first image-forming job "JOB #1".

Process S1407, the image-forming device determines whether the current image-forming operation is completed.

In some embodiments, there is job end flag for each image-forming job, and it can be determined whether the image-forming operations of the current image-forming job are completed according to the job end flag of each image-forming job. For example, the current image-forming job is the first image-forming job "JOB #1", and it is determined whether the image-forming operations of the first image-forming job "JOB #1" are completed by identifying the job end flag of the first image-forming job "JOB #1". If the image-forming operations of the first image-forming job "JOB #1" are completed, process S1408 is performed; otherwise, process S1406 is performed again.

Process S1408, the image-forming device determines whether there is a pending image-forming job.

If there is a pending image-forming job, process S1402 is performed again; if there is no pending image-forming job, all the operations are ended. In some embodiments of the present disclosure, the paper feeding device determined for the first page is different from other pages for each image-forming job, so that the arrangement direction of the first page of the output papers is different from that of other output papers, and each image-forming job can be easily distinguished.

In some implementations, the present disclosure also provides an image-forming device, which includes one or more processors, a memory, and one or more computer programs stored in the memory. The one or more computer programs include instructions that, when executed by the image-forming device, cause the image-forming device to perform some or all of the processes in the method consistent with the present disclosure.

In some implementations, the present disclosure also provides a computer storage medium, where the computer storage medium may store a program, and the program may include some or all of the processes in the method consistent with the present disclosure when executed. The storage medium may be a magnetic disk, an optical disk, a read-only memory (ROM), a random access memory (RAM), etc.

In some implementations, the present disclosure also provides a computer program product, and the computer program product includes executable instructions that, when executed on a computer, cause the computer to perform some or all of the processes in the method consistent with the present disclosure.

In the embodiments of the present disclosure, "at least one" refers to one or more, and "multiple" refers to two or more. The term "and/or" is an association relationship to describe related objects, indicating that there can be three kinds of relationships. For example, A and/or B, which can mean that A exists alone, A and B exist at the same time, and B exists alone, where A and B can be singular or plural. The character "/" generally indicates that the related objects are in an "or" relationship. Expressions such as "at least one of the following" refer to any combination of items, including any combination of single or plural items. For example, at least one of a, b, and c can represent a, b, c, a-b, a-c, b-c, or a-b-c, where a, b, and c can be single or multiple.

Those of ordinary skill in the art can realize that the various units and algorithm processes described in the embodiments disclosed herein can be implemented by electronic hardware, computer software, or a combination of electronic hardware and computer software. Whether these functions are performed by hardware or software depends on specific applications and design constraints of the technical solutions. Those skilled in the art may use different methods for each specific application to implement the described functions, and such implementation should not be considered beyond the scope of the present disclosure.

Those skilled in the art can clearly understand that, as for specific working process of the system, device, and unit described above, reference can be made to the corresponding process of the foregoing method consistent with the present disclosure, which will not be repeated herein for convenience and brevity of description.

In the embodiments of the present disclosure, if any function is implemented in a form of a software functional unit and is sold or used as an independent product, it can be stored in a computer readable storage medium. Based on such understanding, the essential technical solutions of the present disclosure or the part thereof that contributes to the existing technologies or part of the technical solutions can be embodied in a form of a software product. The computer software product is stored in a storage medium, including several instructions to cause a computer device (such as a personal computer, a server, a network device, etc.) or a processor to execute all or part of a method consistent with the present disclosure. The storage medium described above can include a USB disk, a mobile hard disk, a read-only memory (ROM), a random access memory (RAM), a magnetic disk, an optical disks, or another medium that can store program codes.

The above are only some specific embodiments of the present disclosure, and any person skilled in the art can easily conceive modifications or substitutions within the technical scope disclosed in the present disclosure, which should be within the protection scope of the present disclosure. The protection scope of the present application should be subject to the protection scope of the claims.

What is claimed is:

1. A method for forming an image comprising:
receiving a first image-forming job, performing a first part image-forming job in the first image-forming job according to a first recording-medium transport direction, and performing a second part image-forming job in the first image-forming job according to a second recording-medium transport direction, the first recording-medium transport direction being different from second recording-medium transport direction; and
receiving a second image-forming job, performing the first part image-forming job in the second image-forming job according to the first recording-medium transport direction, and performing the second part image-forming job in the second image-forming job according to the second recording-medium transport direction,
wherein the first image-forming job and the second image-forming job are consecutively outputted image-forming jobs.

2. The method according to claim 1, wherein receiving the first image-forming job, performing the first part image-forming job in the first image-forming job according to the first recording-medium transport direction, and performing the second part image-forming job in the first image-forming job according to the second recording-medium transport direction include:
if the first image-forming job is not a first received image-forming job, the first part image-forming job in the first image-forming job is performed according to the first recording-medium transport direction, and the second part image-forming job in the first image-forming job is performed according to the second recording-medium transport direction; and
if the first image-forming job is the first received image-forming job, the first image-forming job is performed according to the first recording-medium transport direction or the second recording-medium transport direction.

3. The method according to claim 1, wherein receiving the second image-forming job, performing the first part image-forming job in the second image-forming job according to the first recording-medium transport direction, and performing the second part image-forming job in the second image-forming job according to the second recording-medium transport direction include:
if the second image-forming job is not a last received image-forming job, the first part image-forming job in the second image-forming job is performed according to the first recording-medium transport direction, and the second part image-forming job in the second image-forming job is performed according to the second recording-medium transport direction; and
if the second image-forming job is the last received image-forming job, the second image-forming job is performed according to the first recording-medium transport direction or the second recording-medium transport direction.

4. The method according to claim 1, wherein:
the first part image-forming job in the first image-forming job is at least one page of the image-forming job, and/or the first part image-forming job in the second image-forming job is at least one page of the image-forming job; and
the second part image-forming job in the first image-forming job is at least one page of the image-forming job, and/or the second part image-forming job in the second image-forming job is at least one page of the image-forming job.

5. The method according to claim 1, wherein:
the first recording-medium transport direction is a recording-medium transport direction when a first recording-medium storage device is selected to perform the image forming operation; and
the second recording-medium transport direction is a recording-medium transport direction when a second recording-medium storage device is selected to perform the image forming operation.

6. The method according to claim 5, wherein:
performing the first image-forming operation according to the first recording-medium transport rule includes selecting a corresponding recording-medium storage device to perform the first image-forming operation according to recording-medium storage device selection information in the first image-forming job; and
performing the second image-forming operation according to the second recording-medium transport rule includes selecting a corresponding recording-medium storage device to perform the second image-forming operation according to recording-medium storage device selection information in the second image-forming job.

7. The method according to claim 1, wherein:
the first image-forming job and the second image-forming job are different image-forming jobs sent to an image-forming device by different control devices or users; or
the first image-forming job and the second image-forming job are different image-forming jobs sent to an image-forming device by a same control device or a user.

8. The method according to claim 1, wherein:
the image-forming device includes at least two paper boxes, and input papers in the at least two paper boxes are arranged in a horizontal direction or in a vertical direction;
the first image-forming job and the second image-forming job include image-forming attribute information, and the image-forming attribute information includes paper box selection information; and
the image-forming device determines one of the at least two paper boxes as a paper feeding device according to the paper box selection information.

9. An image-forming device comprising:
a processor; and
a memory configured to store a computer program, wherein, when the computer program is executed, the processor is configured to perform a method including:
receiving a first image-forming job, performing a first part image-forming job in the first image-forming job according to a first recording-medium transport direction, and performing a second part image-forming job in the first image-forming job according to a second recording-medium transport direction, the first recording-medium transport direction being different from second recording-medium transport direction; and
receiving a second image-forming job, performing the first part image-forming job in the second image-forming job according to the first recording-medium transport direction, and performing the second part image-forming job in the second image-forming job according to the second recording-medium transport direction,
wherein the first image-forming job and the second image-forming job are consecutively outputted image-forming jobs.

10. The device according to claim 9, wherein receiving the first image-forming job, performing the first part image-forming job in the first image-forming job according to the first recording-medium transport direction, and performing the second part image-forming job in the first image-forming job according to the second recording-medium transport direction include:
if the first image-forming job is not a first received image-forming job, the first part image-forming job in the first image-forming job is performed according to the first recording-medium transport direction, and the second part image-forming job in the first image-forming job is performed according to the second recording-medium transport direction; and
if the first image-forming job is the first received image-forming job, the first image-forming job is performed according to the first recording-medium transport direction or the second recording-medium transport direction.

11. The device according to claim 9, wherein receiving the second image-forming job, performing the first part image-forming job in the second image-forming job according to the first recording-medium transport direction, and performing the second part image-forming job in the second image-forming job according to the second recording-medium transport direction include:
if the second image-forming job is not a last received image-forming job, the first part image-forming job in the second image-forming job is performed according to the first recording-medium transport direction, and the second part image-forming job in the second image-forming job is performed according to the second recording-medium transport direction; and
if the second image-forming job is the last received image-forming job, the second image-forming job is performed according to the first recording-medium transport direction or the second recording-medium transport direction.

12. The device according to claim 9, wherein
the first part image-forming job in the first image-forming job is at least one page of the image-forming job, and/or the first part image-forming job in the second image-forming job is at least one page of the image-forming job; and
the second part image-forming job in the first image-forming job is at least one page of the image-forming job, and/or the second part image-forming job in the second image-forming job is at least one page of the image-forming job.

13. The device according to claim 9, wherein
the first recording-medium transport direction is a recording-medium transport direction when a first recording-medium storage device is selected to perform the image forming operation; and
the second recording-medium transport direction is a recording-medium transport direction when a second recording-medium storage device is selected to perform the image forming operation.

14. The device according to claim 9, wherein the first image-forming job and the second image-forming job are different image-forming jobs sent to an image-forming device by different control devices or users; or the first image-forming job and the second image-forming job are different image-forming jobs sent to an image-forming device by a same control device or a user.

15. The device according to claim 9, wherein:
the image-forming device includes at least two paper boxes, and input papers in the at least two paper boxes are arranged in a horizontal direction or in a vertical direction;
the first image-forming job and the second image-forming job include image-forming attribute information, and the image-forming attribute information includes paper box selection information; and
the image-forming device determines one of the at least two paper boxes as a paper feeding device according to the paper box selection information.

16. A non-transitory computer readable storage medium comprising:
a stored program that, when being executed by a processor, causes an image-forming device where the computer readable storage medium is located to perform a method including:
receiving a first image-forming job, and performing a first image-forming operation according to a first recording-medium transport rule; and
receiving a second image-forming job, and performing a second image-forming operation according to a second recording-medium transport rule;
wherein the first image-forming job and the second image-forming job are consecutively outputted image-forming jobs, recording-medium transport directions of at least one page of the first image-forming job and at least one page of the second image-forming job are different, and output papers of the first image-forming job and output papers of the second image-forming job are separated by a first page of the output papers of the second image-forming job or by a last page of the output papers of the first image-forming job.

17. The non-transitory computer readable storage medium according to claim 16, wherein:
the image-forming device includes at least two paper boxes, and input papers in the at least two paper boxes are arranged in a horizontal direction or in a vertical direction;
the first image-forming job and the second image-forming job include image-forming attribute information, and the image-forming attribute information includes paper box selection information; and
the image-forming device determines one of the at least two paper boxes as a paper feeding device according to the paper box selection information.

18. The non-transitory computer readable storage medium according to claim 16, wherein:
receiving the first image-forming job and performing the first image-forming operation according to the first recording-medium transport rule include receiving the first image-forming job, performing a first part image-forming job in the first image-forming job according to a first recording-medium transport direction, and performing a second part image-forming job in the first image-forming job according to a second recording-medium transport direction, the first recording-medium transport direction being different from second recording-medium transport direction; and
receiving the second image-forming job and performing the second image-forming operation according to the second recording-medium transport rule include receiving the second image-forming job, performing the first part image-forming job in the second image-forming job according to the first recording-medium transport direction, and performing the second part image-forming job in the second image-forming job according to the second recording-medium transport direction.

19. The non-transitory computer readable storage medium according to claim 18, wherein:
receiving the first image-forming job, performing the first part image-forming job in the first image-forming job according to the first recording-medium transport direction, and performing the second part image-forming job in the first image-forming job according to the second recording-medium transport direction include:
if the first image-forming job is not a first received image-forming job, the first part image-forming job in the first image-forming job is performed according to the first recording-medium transport direction, and the second part image-forming job in the first image-forming job is performed according to the second recording-medium transport direction; and
if the first image-forming job is the first received image-forming job, the first image-forming job is performed according to the first recording-medium transport direction or the second recording-medium transport direction; and
receiving the second image-forming job, performing the first part image-forming job in the second image-forming job according to the first recording-medium transport direction, and performing the second part image-forming job in the second image-forming job according to the second recording-medium transport direction include:
if the second image-forming job is not a last received image-forming job, the first part image-forming job in the second image-forming job is performed according to the first recording-medium transport direction, and the second part image-forming job in the second image-forming job is performed according to the second recording-medium transport direction; and
if the second image-forming job is the last received image-forming job, the second image-forming job is performed according to the first recording-medium transport direction or the second recording-medium transport direction.

20. The non-transitory computer readable storage medium according to claim 16, wherein the method further includes:
identifying each page in each of the first image-forming job and the second image-forming job through job identification of each page, the job identification including job start identification and job end identification;
determining whether image-forming of each page is completed;
in response to a first paper box being selected to perform a first part image-forming job in the first image-forming job, selecting a second paper box to perform a second part image-forming job in the first image-forming job;
in response to the first paper box being selected to perform a first part image-forming job in the second image-forming job, selecting the second paper box to perform a second part image-forming job in the second image-forming job; and
separating the first print job and the second print job by one or more pages at the start of the second image-forming job or one or more pages at the end of the first image-forming job.

\* \* \* \* \*